(12) United States Patent
Riezebos et al.

(10) Patent No.: US 12,269,174 B2
(45) Date of Patent: Apr. 8, 2025

(54) FABRICATION ASSEMBLY AND METHOD OF AUTOMATED METAL FABRICATION

(71) Applicant: Voortman Steel Machinery Holding B.V., Rijssen (NL)

(72) Inventors: Arie Riezebos, Boekelo (NL); Thomas Martinus Van Der Ploeg, Almelo (NL); Rudy Van Eden, Rijssen (NL)

(73) Assignee: VOORTMAN STEEL MACHINERY HOLDING B.V., Rijssen (NL)

( * ) Notice: Subject to any disclaimer, the term of this patent is extended or adjusted under 35 U.S.C. 154(b) by 0 days.

(21) Appl. No.: 18/727,438

(22) PCT Filed: Feb. 2, 2024

(86) PCT No.: PCT/NL2024/050051
§ 371 (c)(1),
(2) Date: Jul. 9, 2024

(87) PCT Pub. No.: WO2024/167399
PCT Pub. Date: Aug. 15, 2024

(65) Prior Publication Data
US 2024/0416521 A1    Dec. 19, 2024

(30) Foreign Application Priority Data
Feb. 9, 2023 (NL) .................. 2034119

(51) Int. Cl.
*B25J 9/16* (2006.01)
*B23Q 1/52* (2006.01)
(Continued)

(52) U.S. Cl.
CPC ............ *B25J 9/1687* (2013.01); *B23Q 1/525* (2013.01); *B23Q 7/001* (2013.01); *B25J 11/005* (2013.01)

(58) Field of Classification Search
CPC ....... B25J 9/1687; B25J 11/005; B23Q 1/525; B23Q 7/001
See application file for complete search history.

(56) References Cited

U.S. PATENT DOCUMENTS

| | | | |
|---|---|---|---|
| 11,298,781 B2* | 4/2022 | Kitamura | B23Q 1/25 |
| 2022/0168859 A1* | 6/2022 | Hentschke | B23Q 17/2471 |

FOREIGN PATENT DOCUMENTS

| | | |
|---|---|---|
| EP | 2 090 397 A1 | 8/2009 |
| WO | WO 2020/185071 A1 | 9/2020 |

OTHER PUBLICATIONS

International Search Report, issued in PCT/NL2024/050051, dated Apr. 24, 2024.
(Continued)

*Primary Examiner* — Ryan J. Walters
(74) *Attorney, Agent, or Firm* — Birch, Stewart, Kolasch & Birch, LLP

(57) ABSTRACT

A fabrication assembly for automated metal fabrication on an elongate metal workpiece includes: a track; a set of rotator assemblies on one side of the track configured to rotate a received workpiece; at least one fabrication robot movable along the track and configured to perform metal fabrication on the workpiece received by the set of rotator assemblies within a fabrication operational range; a set of trolleys movable along the same track and configured to receive the workpiece thereon, the fabrication assembly being configured to transfer the workpiece between the set of trolleys and the set of rotator assemblies in a horizontal direction transverse to the track within a workpiece transfer range that overlaps with the fabrication operational range. To accommodate the overlap, the at least one fabrication robot may be movable to outside the workpiece transfer range, and the set of trolleys may be movable to outside the fabrication operational range.

23 Claims, 14 Drawing Sheets

(51) Int. Cl.
*B23Q 7/00* (2006.01)
*B25J 11/00* (2006.01)

(56) References Cited

OTHER PUBLICATIONS

Voortmanmachinery. Bibliographic information for "The Voortman Fabricator | automatic stitching and welding system", Online Publication Date: Feb. 3, 2022, XP93076870, URL: https://www.youtube.com/watch?v=3t8y9gvUDgl&t=8s.
Written Opinion of the International Searching Authority, Issued in PCT/NL2024/050051, dated Apr. 24, 2024.

\* cited by examiner

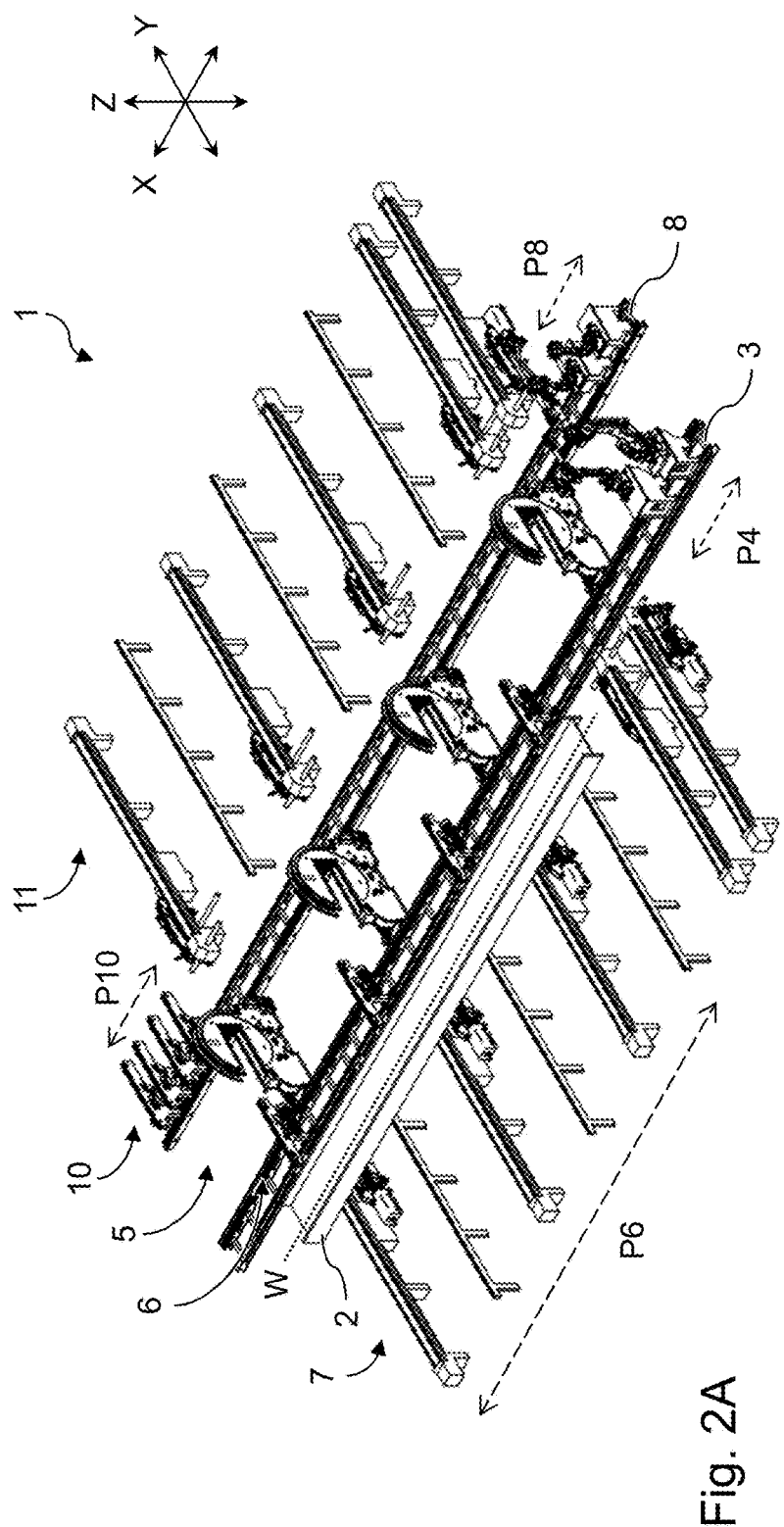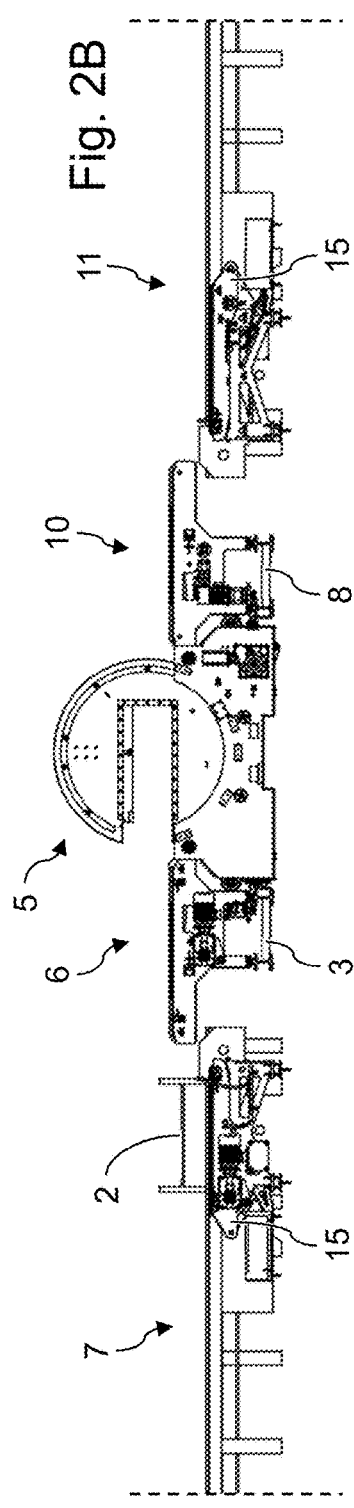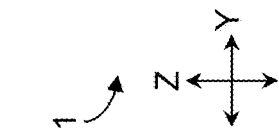

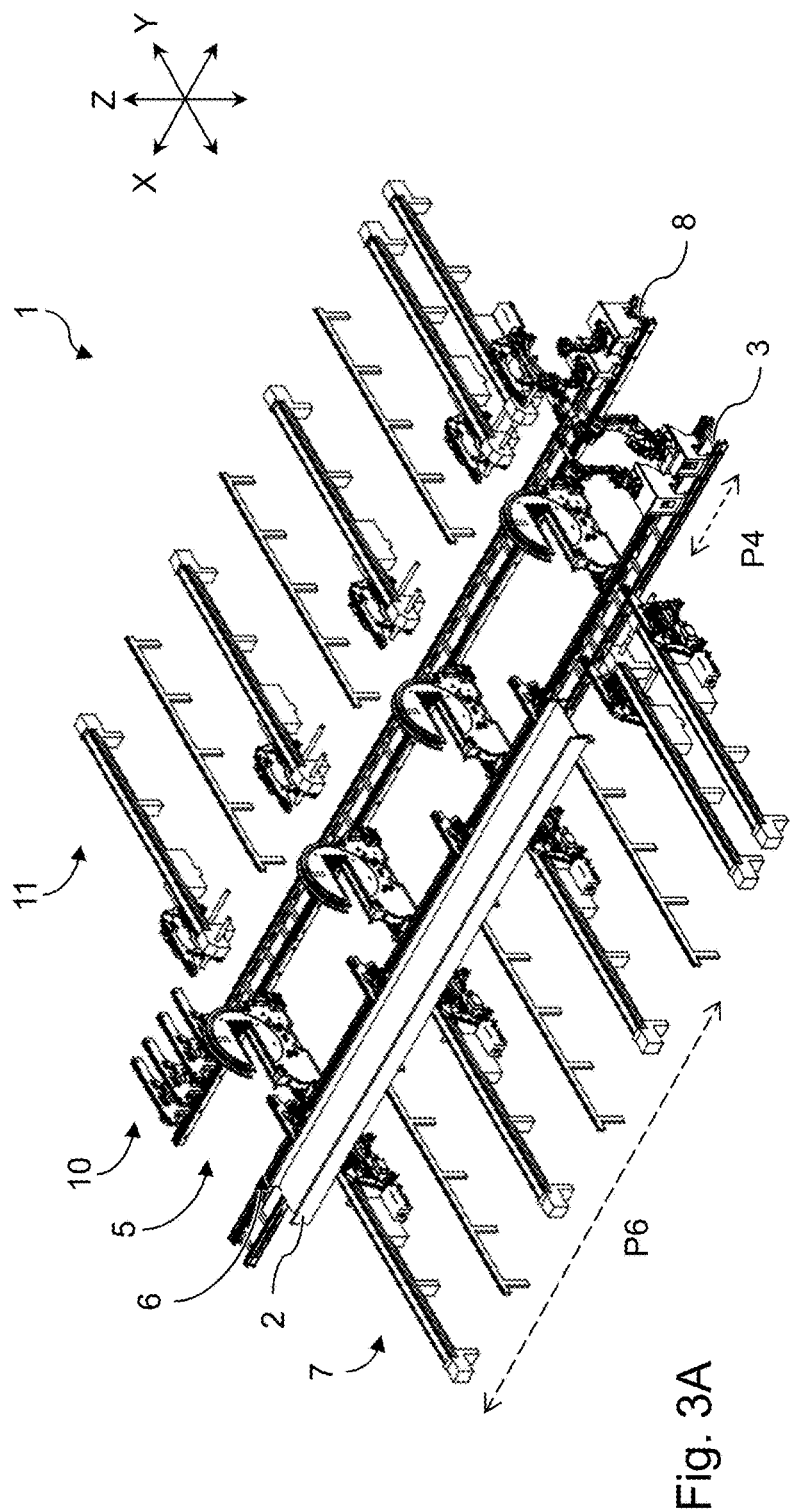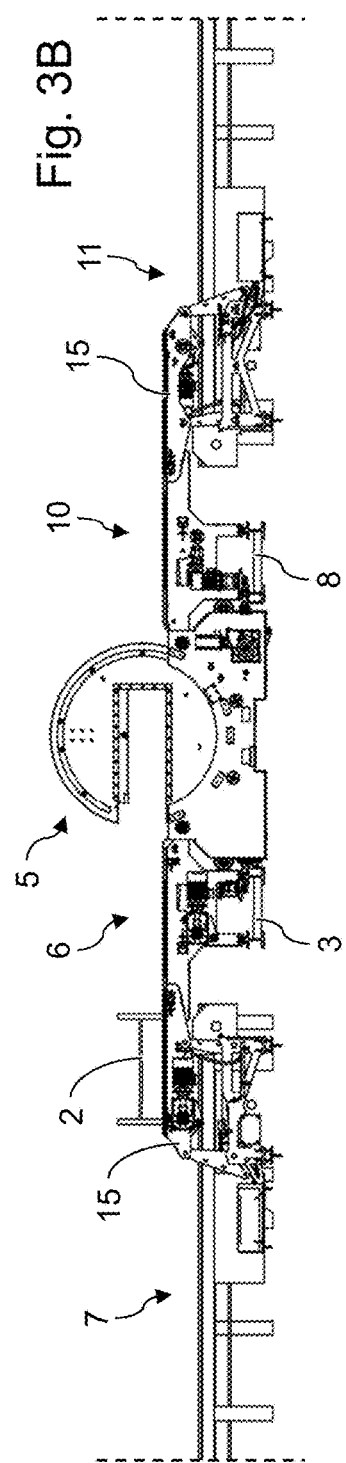

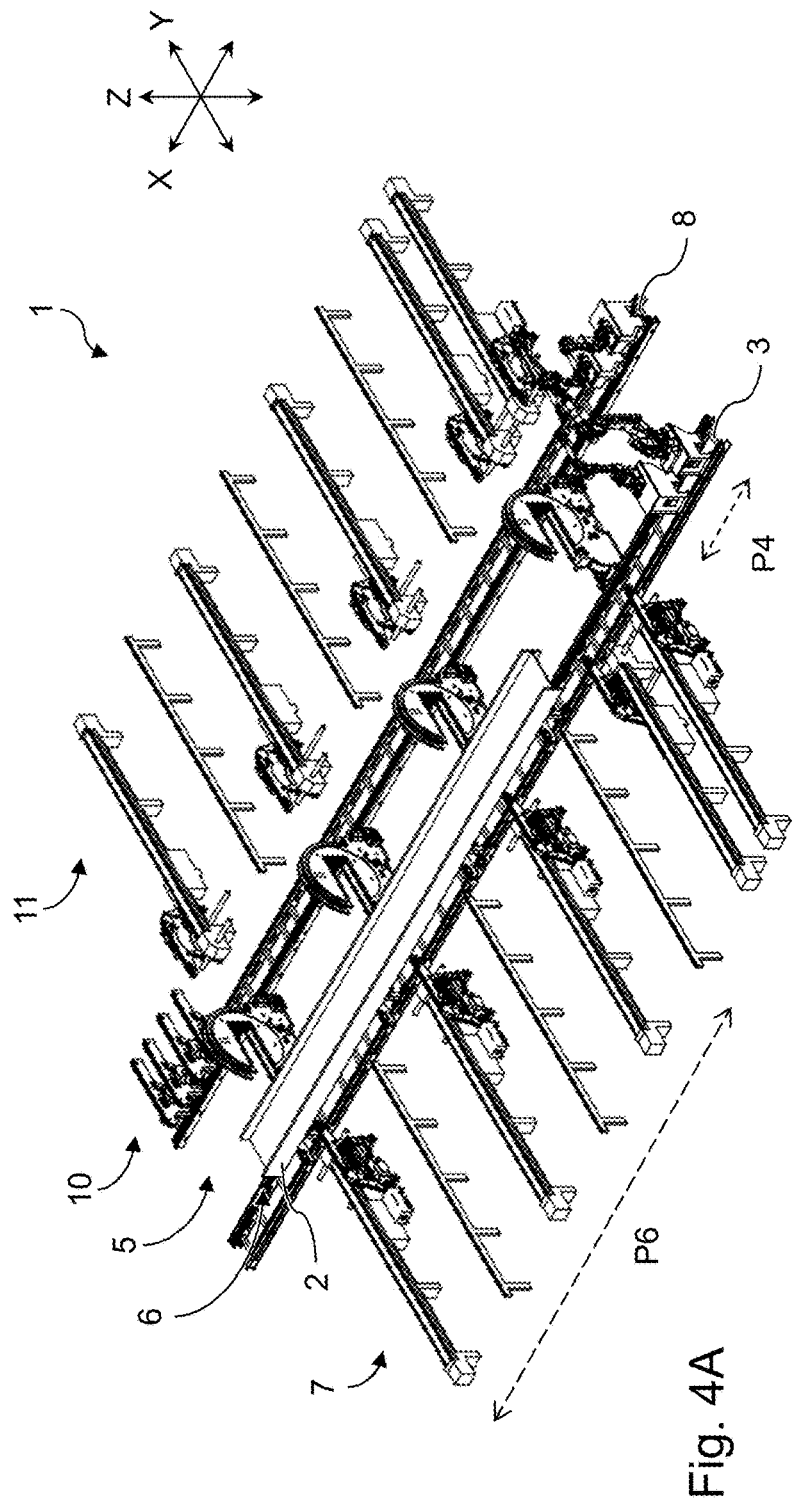
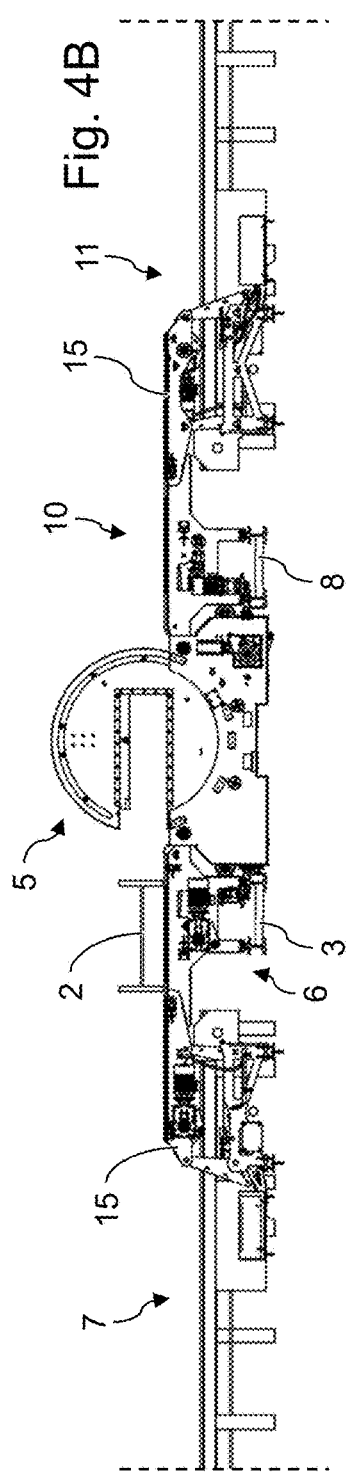
Fig. 4A
Fig. 4B

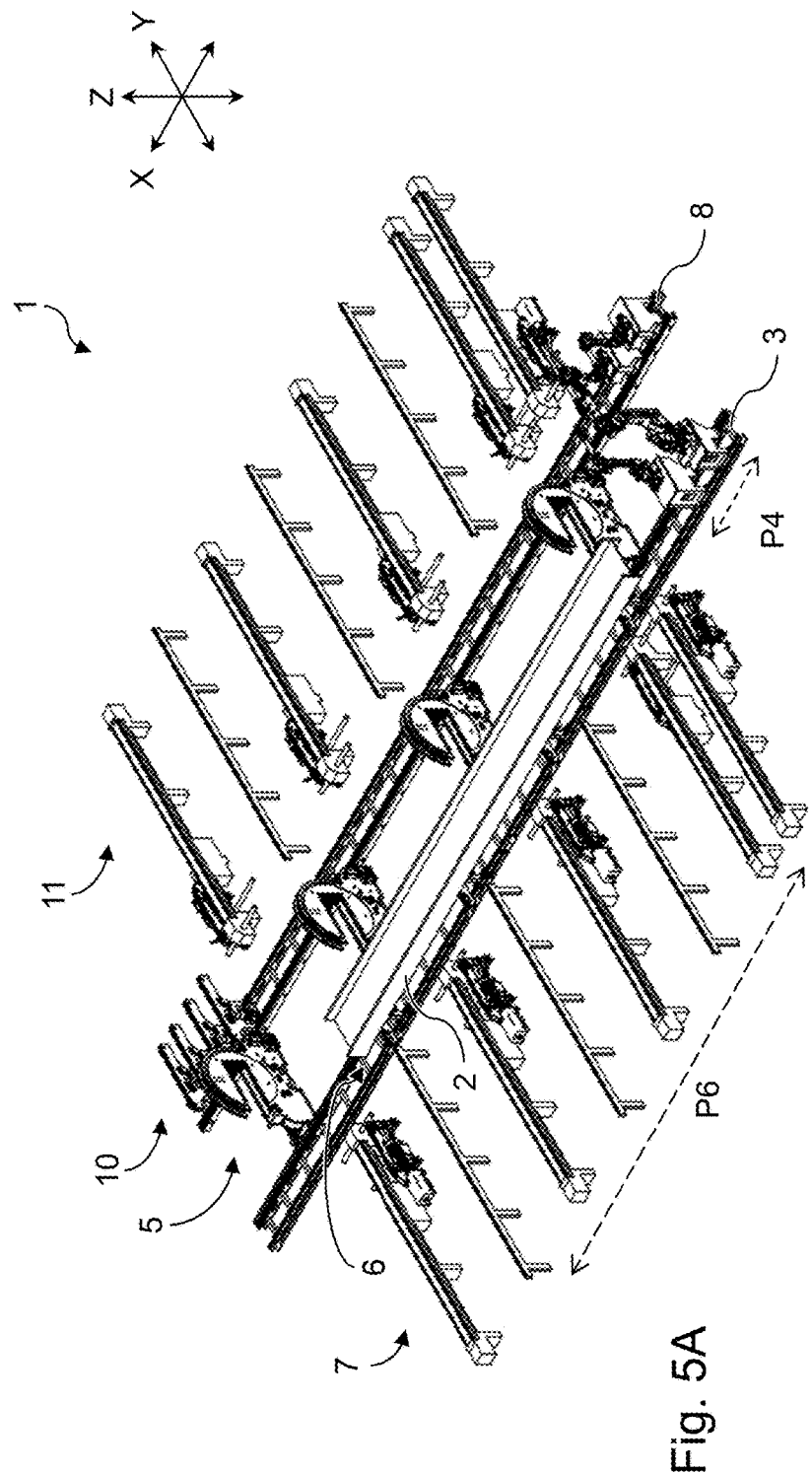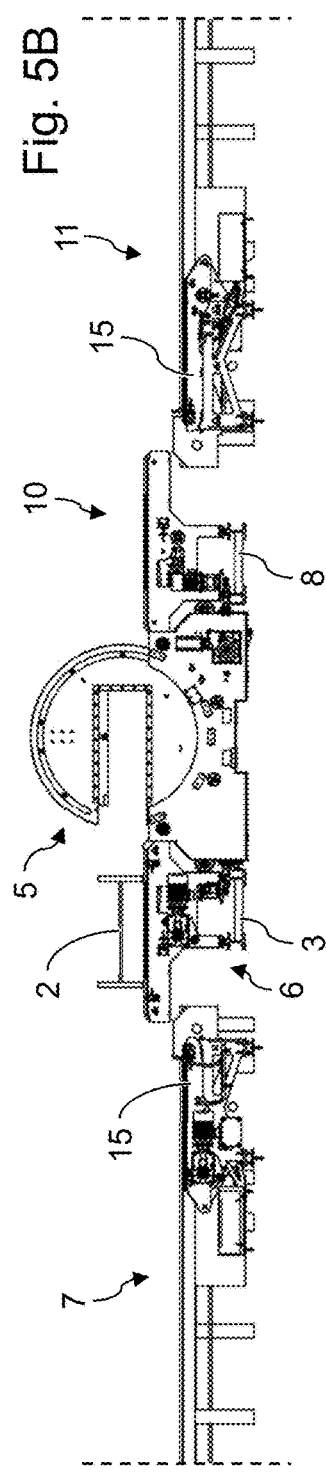

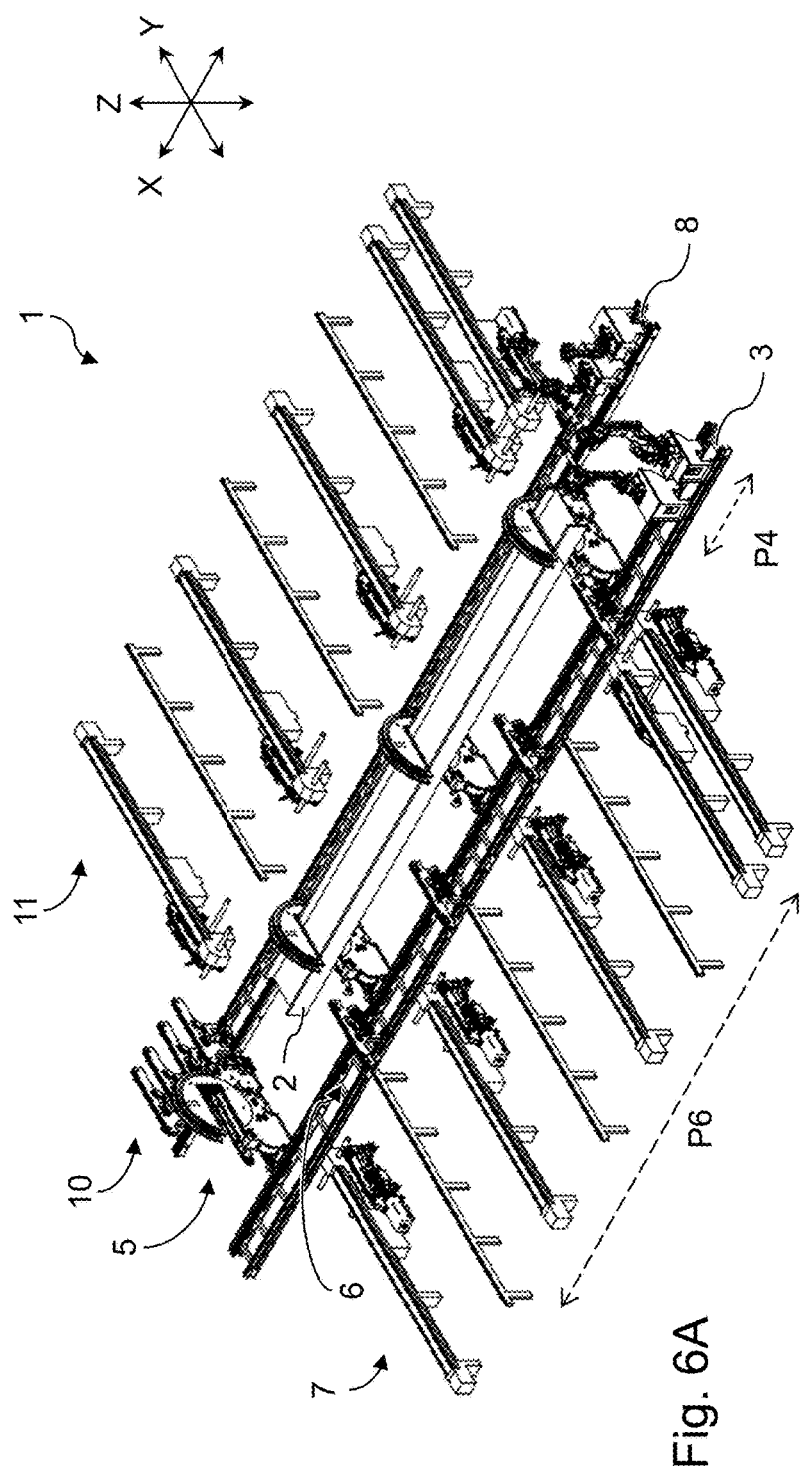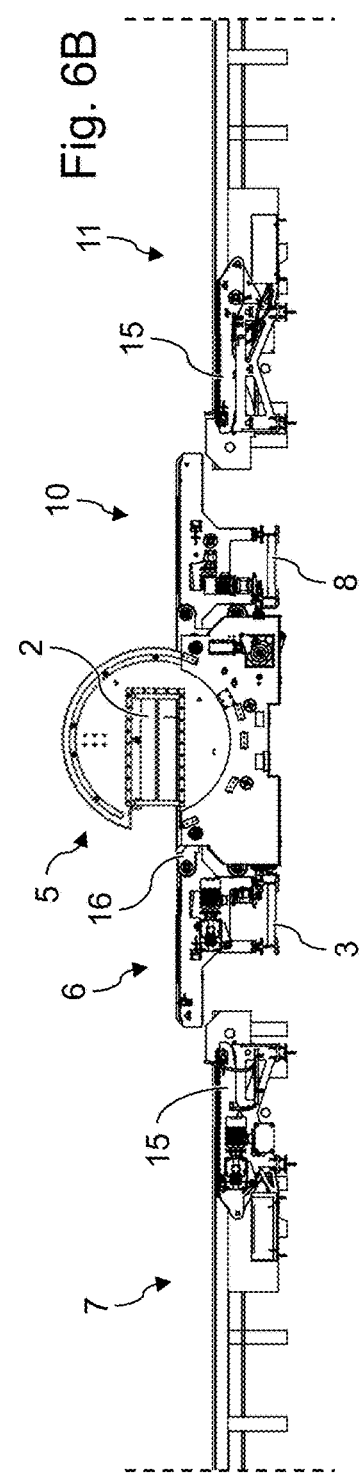

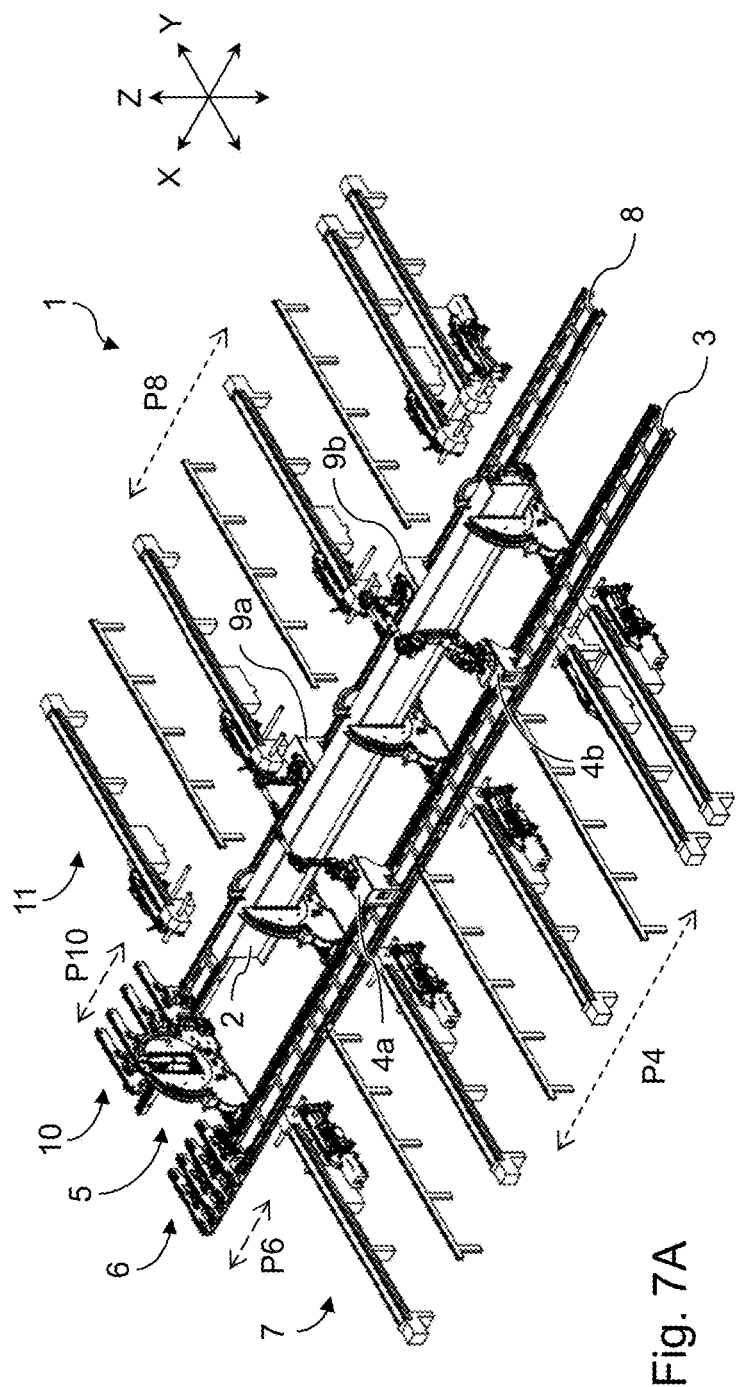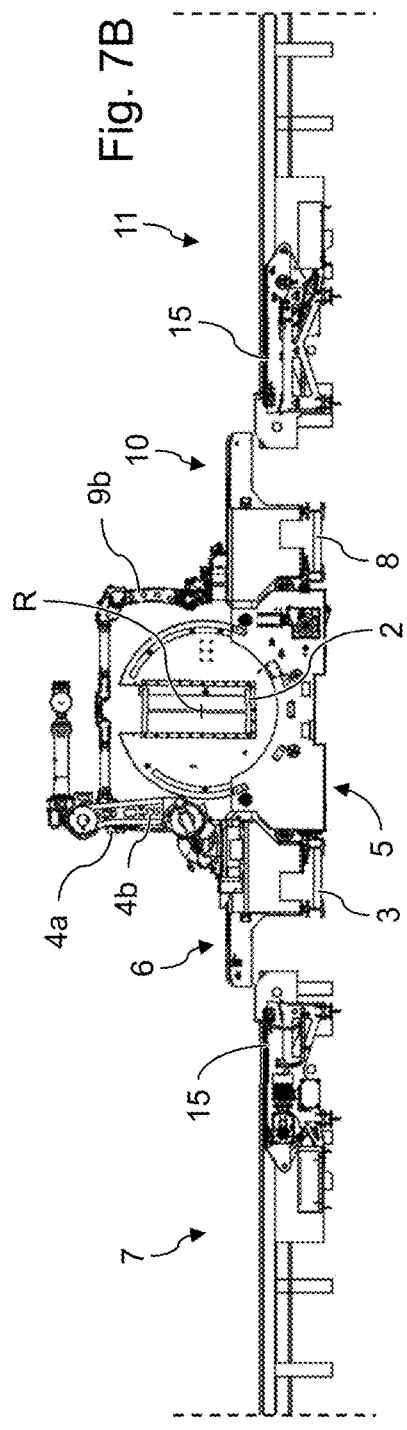

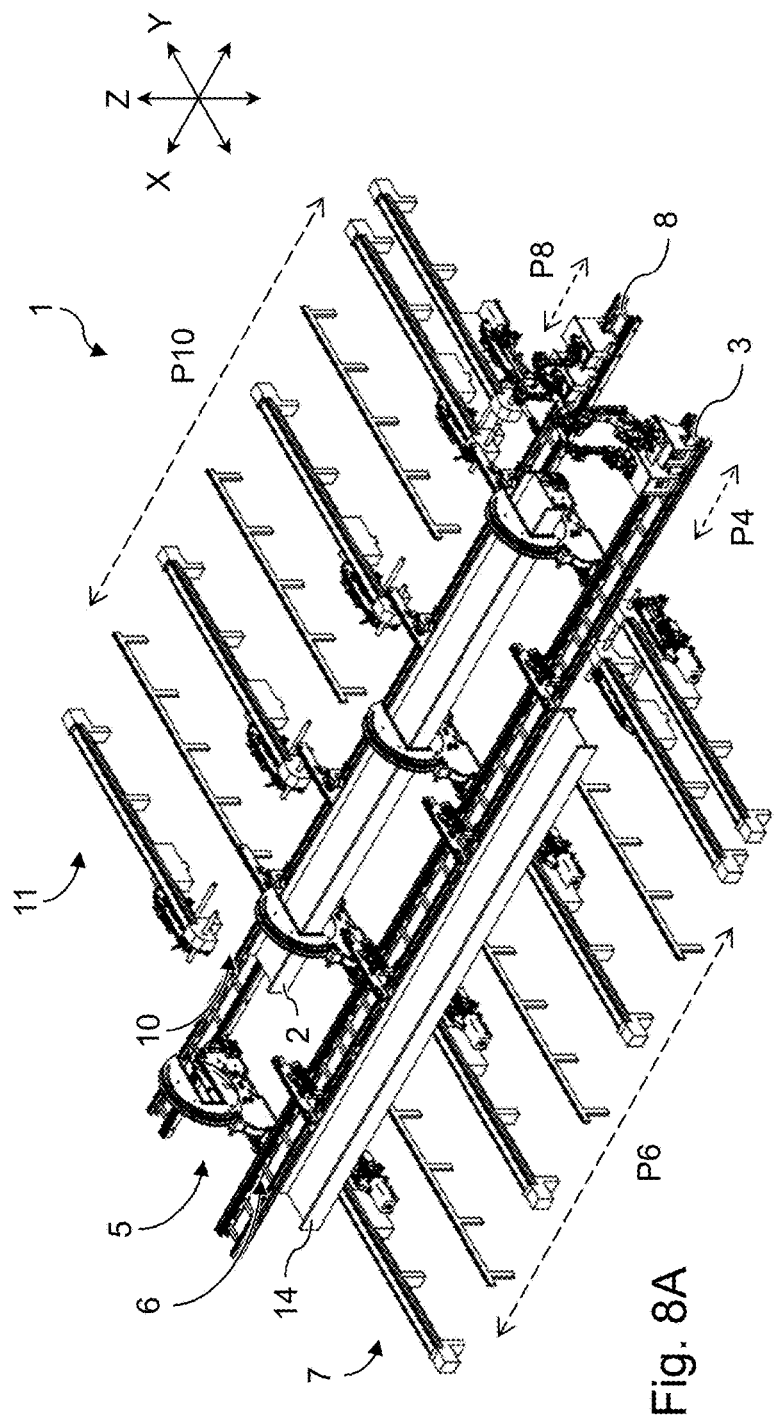
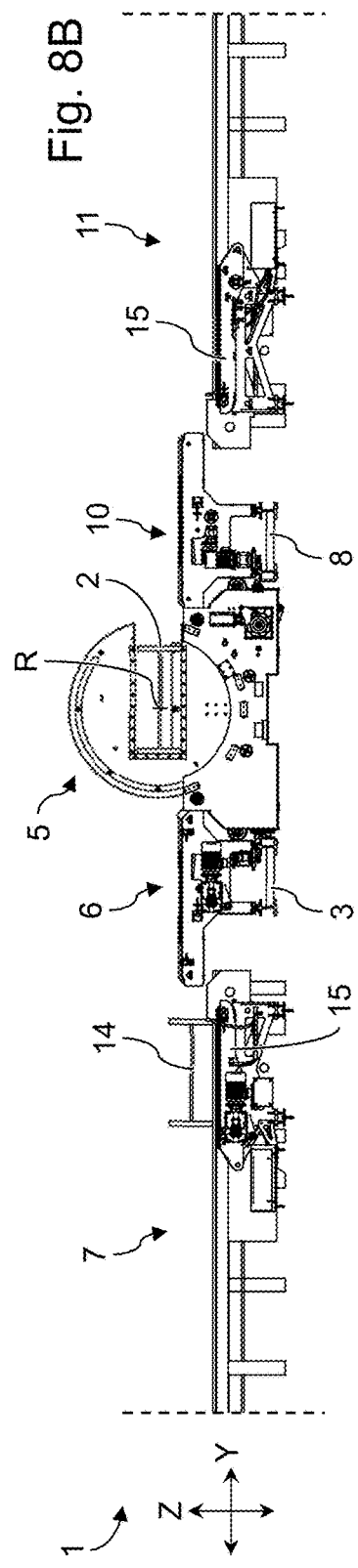

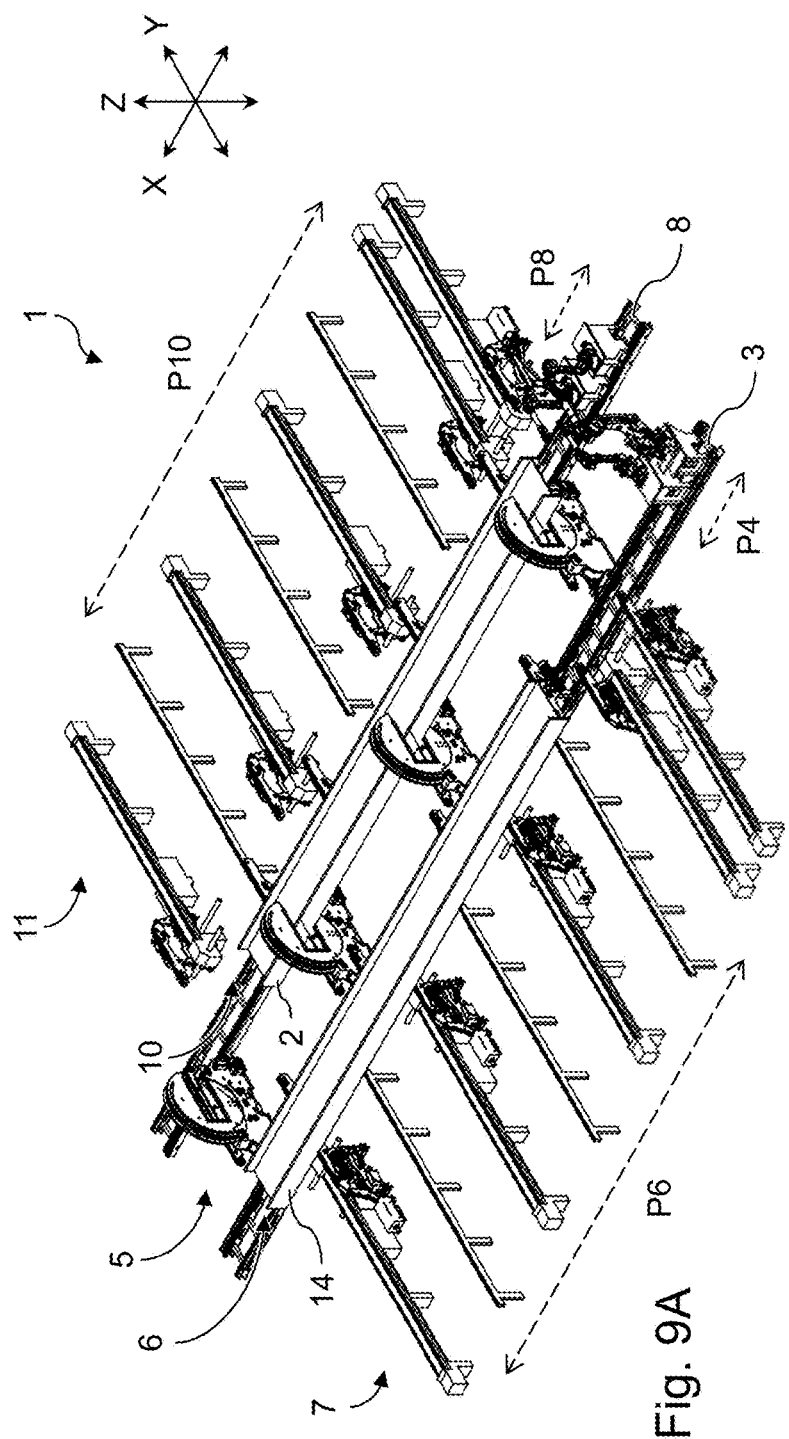
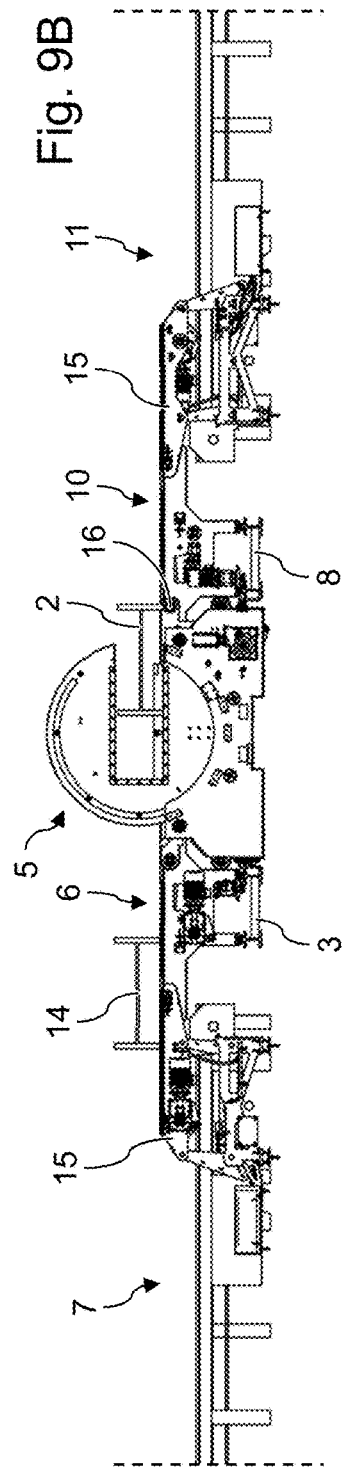
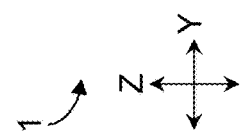

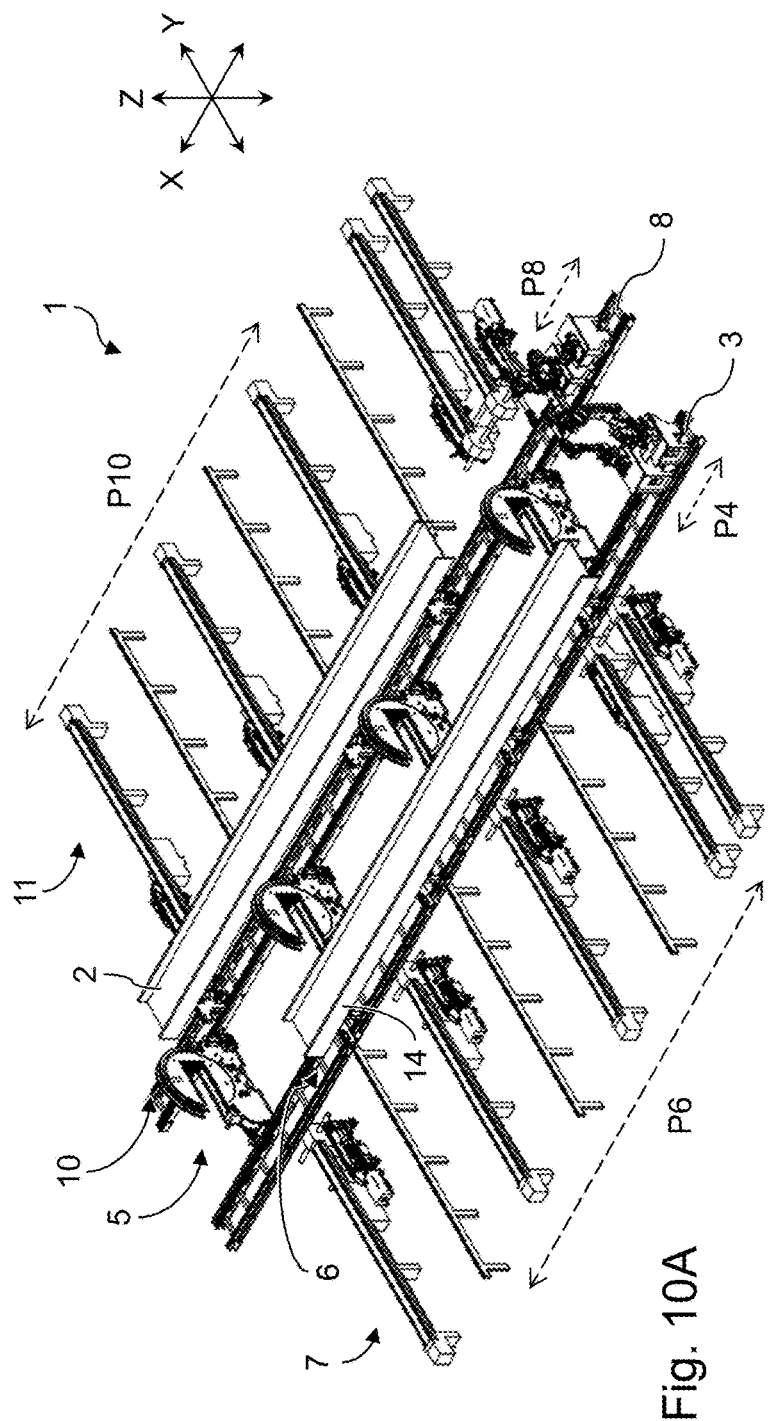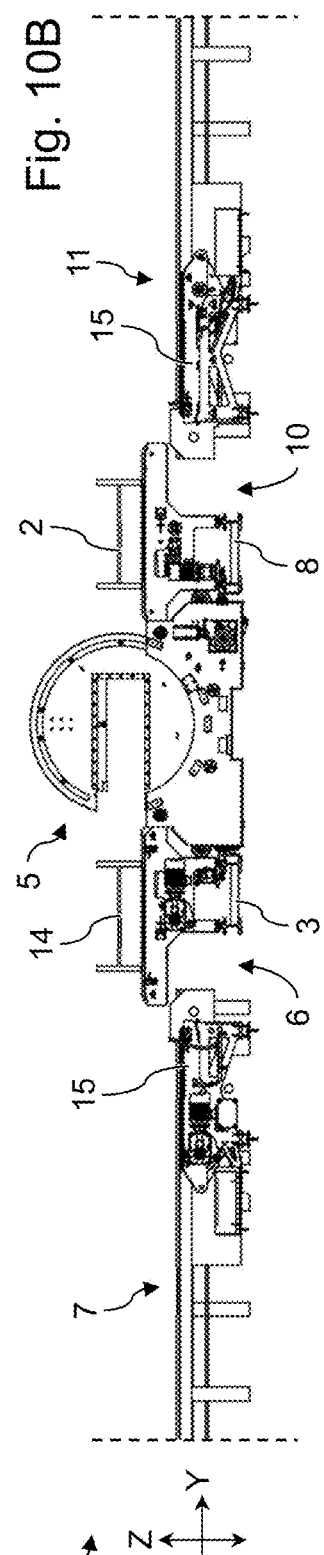

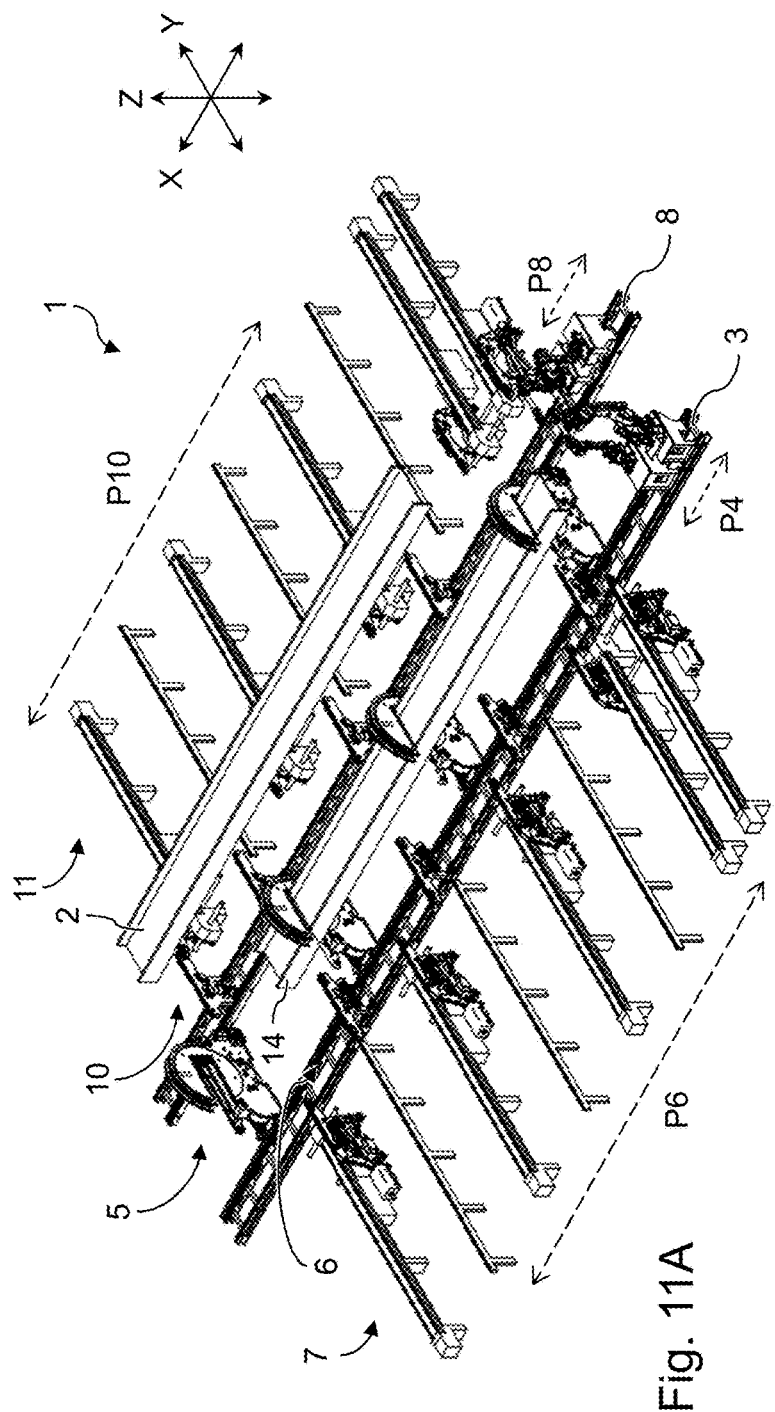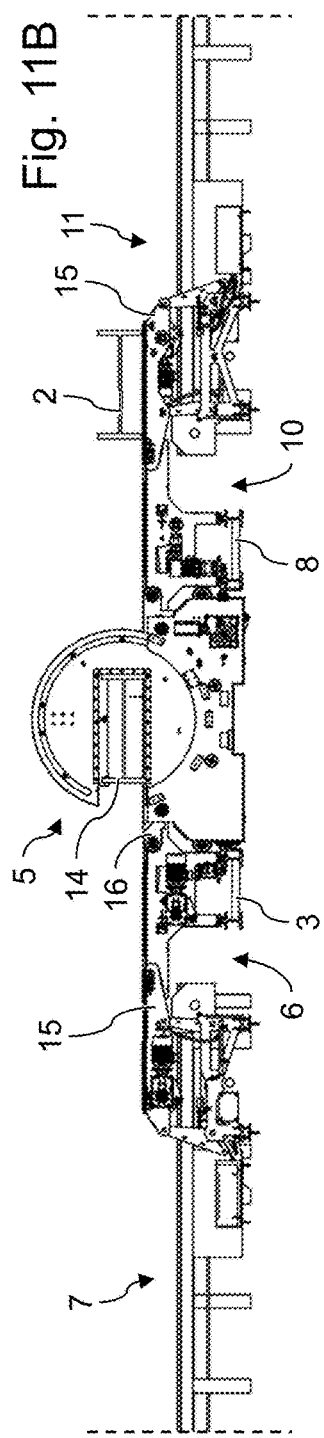
Fig. 11A
Fig. 11B

FABRICATION ASSEMBLY AND METHOD OF AUTOMATED METAL FABRICATION

FIELD

The invention concerns a fabrication assembly for automated metal fabrication on an elongate metal workpiece, as well as a method of automated metal fabrication on an elongate metal workpiece.

BACKGROUND

Fabrication assemblies for automated metal fabrication on an elongate metal workpiece such as a profiled steel beam are known as such. Such automated metal fabrication may for example comprise automatically welding one or more additional pieces to the elongate metal workpiece according to a predefined fabrication design, in particular without direct human involvement in positioning or welding the additional pieces.

A known fabrication assembly comprises: a first track extending horizontally and linearly, defining a horizontal X-direction of the fabrication assembly; at least one first fabrication robot coupled to the first track so as to be movable along the first track at least within a fabrication operational range along the X-direction; a set of rotator assemblies arranged on one side of the first track within the fabrication operational range and configured to receive the elongate metal workpiece with the workpiece main axis substantially parallel to the X-direction, and to rotate the received elongate metal workpiece about a rotator rotation axis substantially parallel to the X-direction, wherein the at least one first fabrication robot is configured to perform metal fabrication action on the elongate metal workpiece within the fabrication operational range when the at least one first fabrication robot is within the fabrication operational range while the elongate metal workpiece is received by the set of rotator assemblies.

A fabrication robot typically comprises an articulated robot arm with an end effector, for example a welding end effector to provide a welding robot for performing welding action as metal fabrication action, and/or a handling end effector to provide a handling robot for performing handling action as metal fabrication action. To allow fabrication to be performed from two sides of the workpiece simultaneously, a second track with at least one second fabrication robot may be provided parallel to the first track at an opposite side of the set of rotator assemblies from the first track.

Before the actual fabrication can begin, the workpiece generally needs to be transferred to the set of rotator assemblies to be received thereby. Once the actual fabrication has been completed, the workpiece generally needs to be transferred away from the set of rotator assemblies. Such transfers are traditionally performed by a hoisting assembly or the-like by which the workpiece can be transferred to and from the set of rotator assemblies vertically, so as to avoid interfering with the fabrication robots. As one possible alternative thereto, it has been proposed to cause the set of rotator assemblies to transport the workpiece along the X-direction to and from the fabrication operational range to allow a substantially lateral transfer to and from set the rotator assemblies in an area remote from fabrication operational range.

SUMMARY

An object of the present invention is to enable automated metal fabrication on an elongate metal workpiece to be more efficient, economical, more versatile, more adaptable to spatial constraints and/or less complex. An object is to provide a fabrication assembly that can be relatively compact, is relatively easy to integrate in various automated production lines, and/or is relatively easy to transport, e.g. in relatively compact parts. An object is to at least provide an alternative assembly and/or method for automated metal fabrication on an elongate metal workpiece.

Thereto, an aspect of the invention provides a fabrication assembly according to claim 1, for automated metal fabrication on an elongate metal workpiece having a workpiece main axis. The fabrication assembly comprises: a first track extending horizontally and linearly, defining a horizontal X-direction of the fabrication assembly; at least one first fabrication robot coupled to the first track so as to be movable along the first track at least within a fabrication operational range along the X-direction; and a set of rotator assemblies arranged, at least arrangeable, on one side of the first track within the fabrication operational range and configured to receive the elongate metal workpiece with the workpiece main axis substantially parallel to the X-direction, and to rotate the received elongate metal workpiece about a rotator rotation axis substantially parallel to the X-direction. The at least one first fabrication robot is configured to perform metal fabrication action on the elongate metal workpiece within the fabrication operational range when the at least one first fabrication robot is within the fabrication operational range while the elongate metal workpiece is received by the set of rotator assemblies within the fabrication operational range.

The fabrication assembly further comprises a first set of trolleys movable along the first track at least within a workpiece transfer range along the X-direction that at least partly overlaps with the fabrication operational range, the first set of trolleys being configured to receive the elongate metal workpiece thereon with the workpiece main axis substantially parallel to the X-direction, wherein the fabrication assembly is configured to transfer the elongate metal workpiece between the first set of trolleys and the set of rotator assemblies within the workpiece transfer range substantially in a Y-direction being a horizontal direction transverse to the X-direction.

Advantageously, since the workpiece transfer range at least partly overlaps with the fabrication operational range, the fabrication assembly can be relatively compact and relatively easy to integrate in production lines. Contrary to known assemblies, transfer of the workpiece to and from the set of rotator assemblies need not depend on hoisting nor on the set of rotator assemblies leaving the fabrication operational range. Time consumption, use of space and constructional complexity associated with such transfers can thereby be reduced. During transfer of a workpiece, the set of trolleys may be positioned along the track to be at least partly within the fabrication operational range. Conversely, during performance of the metal fabrication, the at least one first robot may be positioned along the track to be at least partly within the workpiece transfer range. The invention advantageously exploits that the at least one first robot can be idle during such transfers, and similarly that such transfers may only need to occur when the at least one first robot is idle, so that there is an opportunity for the fabrication operational range and the workpiece transfer range to overlap without necessarily hampering either the fabrication performance or the transfers.

To accommodate the overlap, the at least one first fabrication robot may be movable to outside the workpiece transfer range, and the set of trolleys may be movable to outside the fabrication operational range, as will be explained further in the detailed description.

To provide a particularly compact and versatile fabrication assembly, the workpiece transfer range may overlap with at least 50% of the fabrication operational range, preferably at least 60%, more preferably at least 70%, for example about 80% or more. Similarly, the fabrication operational range may overlap with at least 50% of the workpiece transfer range, preferably at least 60%, more preferably at least 70%, for example about 80% or more.

A further aspect provides a method of automated metal fabrication on an elongate metal workpiece having a workpiece main axis. The method comprises: providing a fabrication assembly as described herein; receiving the elongate metal workpiece on the first set of trolleys with the workpiece main axis substantially parallel to the X-direction; causing the fabrication assembly to transfer the elongate metal workpiece from the first set of trolleys to the set of rotator assemblies within the workpiece transfer range substantially in the Y-direction, thereby causing the elongate metal workpiece to be received by the set of rotator assemblies; and causing the fabrication assembly to perform metal fabrication on the elongate metal workpiece within the fabrication operational range while the elongate metal workpiece is received by the set of rotator assemblies.

Such a method provides above-described advantages.

Optional advantageous elaborations of the above aspects are provided by the features of the dependent claims, as explained further in the detailed description below.

DETAILED DESCRIPTION

In the following, the invention will be explained further using examples of embodiments and drawings. The drawings are schematic and merely show examples. In the drawings, corresponding elements have been provided with corresponding reference signs. In the drawings:

FIGS. 2A and 2B show a perspective view, respectively a side view, of the fabrication assembly, with a first workpiece on a first cross transport assembly;

FIGS. 3A and 3B show a perspective view, respectively a side view, of the fabrication assembly, with the first workpiece lifted to a level of the first set of trolleys by a lifter of the first cross transport assembly;

FIGS. 4A and 4B show a perspective view, respectively a side view, of the fabrication assembly, with the first workpiece on the first set of trolleys;

FIGS. 5A and 5B show a perspective view, respectively a side view, of the fabrication assembly, wherein the first set of trolleys with the first workpiece thereon has been moved along the X-direction;

FIGS. 6A and 6B show a perspective view, respectively a side view, of the fabrication assembly, with the first workpiece received by the set of rotator assemblies;

FIGS. 7A and 7B show a perspective view, respectively a side view, of the fabrication assembly, wherein fabrication robots are arranged to perform metal fabrication action on the first workpiece received in the set of rotator assemblies;

FIGS. 8A and 8B show a perspective view, respectively a side view, of the fabrication assembly, with the first workpiece ready to be moved from the set of rotator assemblies onto a second set of trolleys, and a subsequent second workpiece on the first cross transport assembly;

FIGS. 9A and 9B show a perspective view, respectively a side view, of the fabrication assembly, with the first workpiece being moved onto the second set of trolleys and the second workpiece being moved onto the first set of trolleys;

FIGS. 10A and 10B show a perspective view, respectively a side view, of the fabrication assembly, wherein the second set of trolleys with the first workpiece thereon has been moved along the X-direction and the second workpiece is ready to be moved from the first set of trolleys to the set of rotator assemblies;

FIGS. 11A and 11B show a perspective view, respectively a side view, of the fabrication assembly, with the first workpiece received on a lifter of a second cross transport assembly and the second workpiece received by the set of rotator assemblies;

Figure 1:
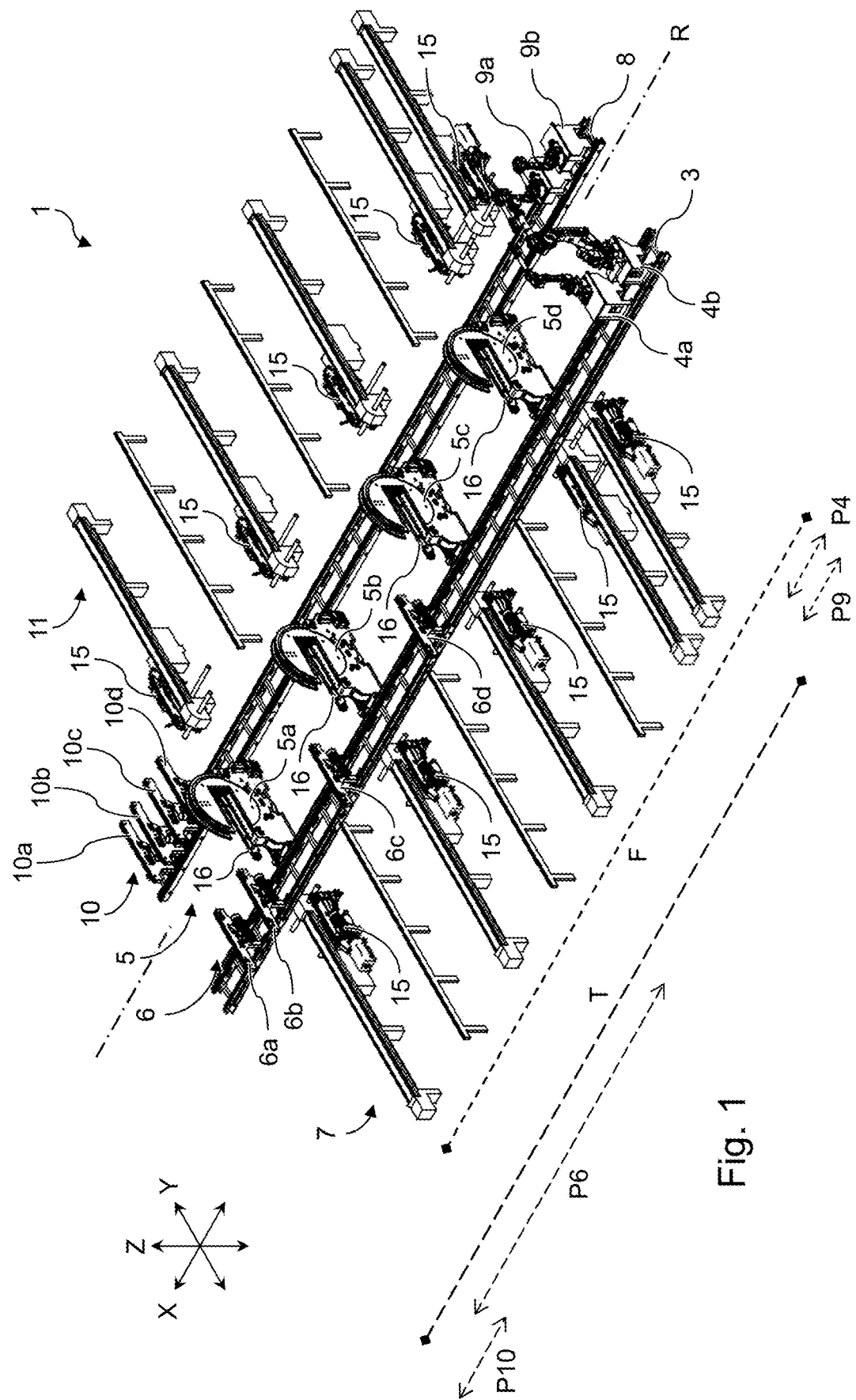
FIG. 1 shows a perspective view of an example of a fabrication assembly according to embodiments.

The figures show examples of a fabrication assembly 1 for automated metal fabrication on an elongate metal workpiece 2 having a workpiece main axis W. The fabrication assembly 1 comprises a first track 3 extending horizontally and linearly, defining a horizontal X-direction X of the fabrication assembly 1. The fabrication assembly 1 comprises at least one first fabrication robot 4a, 4b coupled to the first track 3 so as to be movable along the first track 3 at least within a fabrication operational range F along the X-direction. The fabrication assembly 1 comprises a set 5 of rotator assemblies 5a-5d arranged, at least arrangeable, on one side of the first track 3 within the fabrication operational range F and configured to receive the elongate metal workpiece 2 with the workpiece main axis W substantially parallel to the X-direction, and to rotate the received elongate metal workpiece 2 about a rotator rotation axis R substantially parallel to the X-direction.

The at least one first fabrication robot 4a, 4b is configured to perform metal fabrication action on the elongate metal workpiece 2 within the fabrication operational range F when the at least one first fabrication robot 4a, 4b is within the fabrication operational range F while the elongate metal workpiece 2 is received by the set 5 of rotator assemblies 5a-5d within the fabrication operational range F, for example as shown in FIGS. 7A-B. For clarity of the drawings, the at least one first fabrication robot 4a, 4b is not shown in the side views of FIGS. 2B, 3B, 4B, 5B, 6B, 8B, 9B, 10B, 11B.

The fabrication assembly 1 further comprises a first set 6 of trolleys 6a-6d movable along the first track 3 at least within a workpiece transfer range T along the X-direction that at least partly overlaps with the fabrication operational range F, the first set 6 of trolleys 6a-6d being configured to receive the elongate metal workpiece 2 thereon with the workpiece main axis W substantially parallel to the X-direction.

The fabrication assembly 1 is configured to transfer the elongate metal workpiece 2 between the first set 6 of trolleys 6a-6d and the set 5 of rotator assemblies 5a-5d within the workpiece transfer range T substantially in a Y-direction Y being a horizontal direction transverse to the X-direction X, for example as shown in FIGS. 5A-6B.

With respect to the example shown in FIGS. 1 to 11B, for clarity of the drawings, the workpiece transfer range T and the fabrication operational range F have only been indicated in FIG. 1, wherein in the remaining FIGS. 2A to 11B those ranges remain fixed with respect to the fixed elements of the assembly 1 such as rails 3 and 8 and cross transport assemblies 7 and 11. Further, for clarity of the drawings, some elements have been provided with reference signs in only one or some of the figures, in particular in FIG. 1, while being correspondingly visible in other figures.

The figures also illustrate a method of automated metal fabrication on an elongate metal workpiece 2 having a workpiece main axis W. The method comprises: providing a fabrication assembly 1 as described herein; receiving the elongate metal workpiece 2 on the first set 6 of trolleys 6a-6d with the workpiece main axis W substantially parallel to the X-direction (see e.g. FIGS. 3A-4B); causing the fabrication assembly 1 to transfer the elongate metal workpiece 2 from the first set 6 of trolleys 6a-6d to the set 5 of rotator assemblies 5a-5d within the workpiece transfer range T substantially in the Y-direction, thereby causing the elongate metal workpiece 2 to be received by the set 5 of rotator assemblies 5a-5b (see e.g. FIGS. 5A-6B); and causing the fabrication assembly 1 to perform metal fabrication on the elongate metal workpiece 2 within the fabrication operational range F while the elongate metal workpiece 2 is received by the set 5 of rotator assemblies 5a-5d (see e.g. FIGS. 7A-B).

Advantages of such an assembly 1 and method have been described in the summary section above.

In embodiments, including in the shown examples, the first set 6 of trolleys 6a-6d bridges the first track 3 in the Y-direction, for example as shown in FIG. 2B.

In this way, the workpiece 2 can advantageously cross the first track 3 in the Y-direction via the first set 6 of trolleys 6a-6d, for example from a cross transport assembly 7 discussed elsewhere herein. In conventional fabrication assemblies, such a crossing generally requires the workpiece to be suspended, e.g. from a hoisting assembly. The need for such a hoisting assembly can thus be obviated by provision of the first set 6 of trolleys 6a-6d.

In embodiments, including in the shown examples, the first set 6 of trolleys 6a-6d is coupled to the first track 3.

In this way, the same track 3 can advantageously be used by both the at least one first fabrication robot 4a, 4b and the first set 6 of trolleys 6a-6d. Alternatively, an adjacent parallel track could be provided for the first set of trolleys, wherein the respective trolleys could then still bridge the track 3 of the at least one first fabrication robot 4a, 4b, for example using a cantilever configuration.

Figure 12:
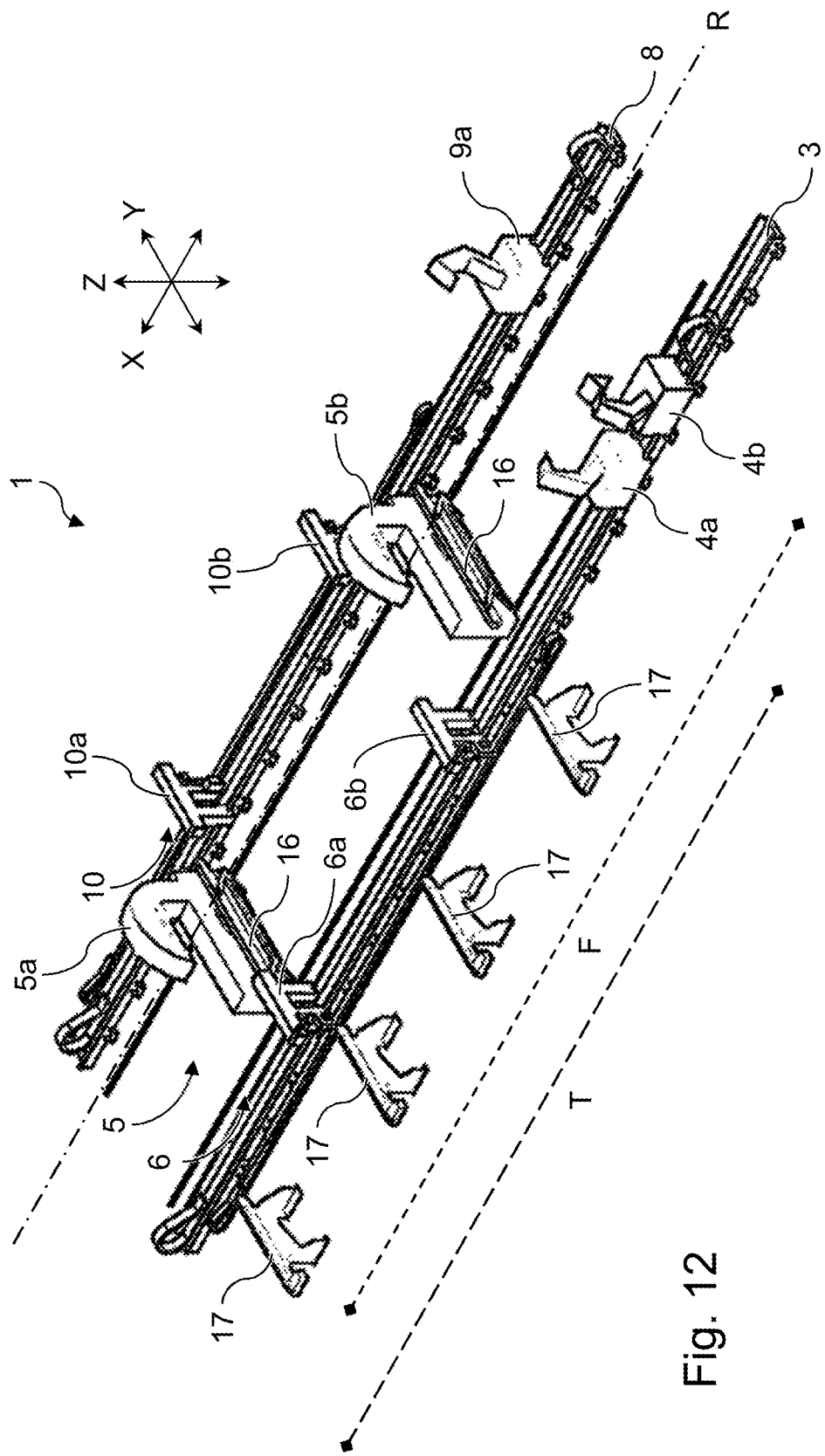
FIG. 12 shows a perspective view of a further example of a fabrication assembly according to embodiments.
Figure 13:
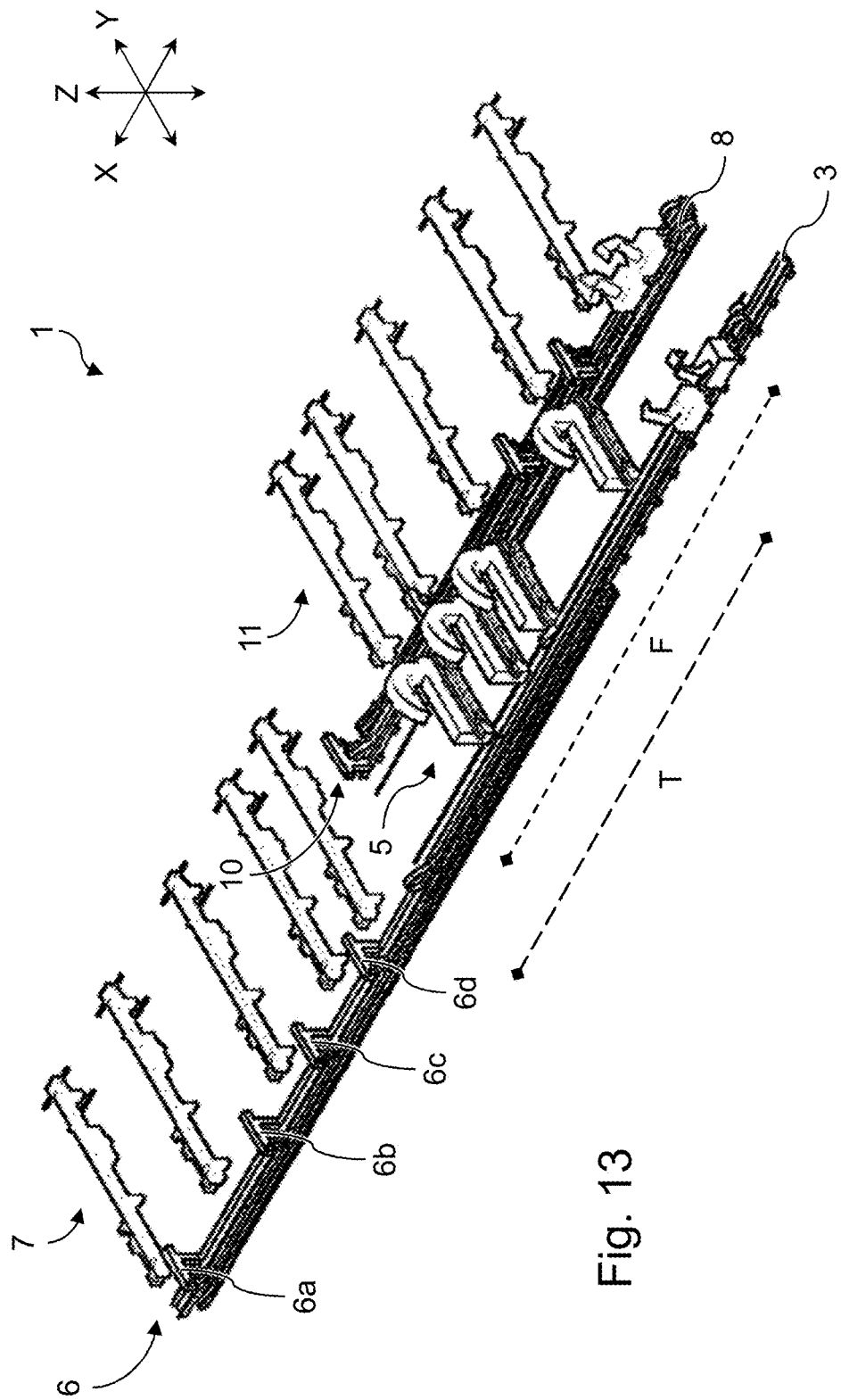
FIG. 13 shows a perspective view of a yet further example of a fabrication assembly according to embodiments.

In embodiments, including in the shown examples, the at least one first fabrication robot 4a, 4b is movable along the first track 3 to outside the workpiece transfer range T, for example as shown in FIGS. 1, 12 and 13.

In embodiments of the method, the at least one first fabrication robot 4a, 4b is positioned outside the workpiece transfer range T while the elongate metal workpiece 2 is on the first set 6 of trolleys 6a-6d.

In this way, the at least one first fabrication robot 4a, 4b need not hamper the transfer of the workpiece 2 in the workpiece transfer range T. Since such fabrication robots may already be designed to move along such a track relatively quickly, they may thus be able to make room for transfer of the workpiece in a relatively time-efficient way. The at least one first fabrication robot 4a, 4b may for example be movable to outside the workpiece transfer range T at one end of the workpiece transfer range T, beyond which end the fabrication operational range F may then extend, e.g. as in the shown examples. Still, it is possible that in practice, the at least one first fabrication robot 4a, 4b only performs metal fabrication action on the elongate metal workpiece 2 within a subrange of the fabrication operational range F that overlaps with the workpiece transfer range T, in particular in case the set 5 of rotator assemblies 5a-5d do not move the received workpiece 2 along the X-direction, as may be preferred for efficiency purposes.

Alternatively or additionally to the at least one first fabrication robot 4a, 4b moving outside the workpiece transfer range T, the at least one first fabrication robot may be adjustable, e.g. retractable, to extend only below a level at which the elongate metal workpiece is received on the first set of trolleys.

In embodiments, including in the shown examples, the first set 6 of trolleys 6a-6d is movable along the first track 3 to outside the fabrication operational range F.

In embodiments of the method, the first set 6 of trolleys 6a-6d is positioned outside the fabrication operational range F while metal fabrication is performed by the fabrication assembly 1 using the at least one first fabrication robot 6a, 6b.

Thereby, the first set 6 of trolleys 6a-6d need not hamper the performance of metal fabrication action by the at least one first fabrication robot 4a, 4b in the fabrication operational range F.

Alternatively or additionally, the first set of trolleys and/or the at least one first fabrication robot may be adjustable, for example having a relatively large and versatile robot arm, such that the at least one first fabrication robot can reach the elongate metal workpiece for performing metal fabrication action thereon while one or more trolleys of the first set of trolleys are within the fabrication operational range.

In embodiments, including in the shown examples, the workpiece transfer range T overlaps with at least 50% of the fabrication operational range F, preferably at least 60%, more preferably at least 70%, for example about 80%.

In embodiments, including in the shown examples, the fabrication operational range F overlaps with at least 50% of the workpiece transfer range T, preferably at least 60%, more preferably at least 70%, for example about 80%.

As indicated in the summary section above, a particularly compact and versatile fabrication assembly can thus be provided. Larger overlaps of up to 100% among the ranges are not excluded, in particular in case the set 5 of rotator assemblies 5a-5d is not configured to move the received workpiece 2 along the X-direction, in which case the set 5 of rotator assemblies 5a-5d may essentially constrain both ranges with respect to movement ranges of the at least one first fabrication robot 4a, 4b and the first set 6 of trolleys 6a-6d.

In embodiments, including in the shown examples, the first set 6 of trolleys 6a-6d defines a time-variable first trolley position range P6 along the X-direction depending on actual positions of the first set 6 of trolleys 6a-6d along the first track 3, wherein the at least one first fabrication robot 4a, 4b defines a time-variable first fabrication robot position range P4 along the X-direction depending on the actual position or positions of the at least one first fabrication robot 4a, 4b along the first track 3, wherein the fabrication assembly 1 is configured to prevent any overlap between the first trolley position range P6 and the first fabrication robot position range P4 at any given time.

Thereby, it can be promoted that the first set 6 of trolleys 6a-6d and the at least one first fabrication robot 4a, 4b operate without hampering each other, wherein for example the at least one first fabrication robot 4a, 4b moves out of the workpiece transfer range T to one end of the track 3 when the first set 6 of trolleys 6a-6d moves into the fabrication operational range F from an opposite end of the track 3, and vice versa.

Alternatively, the at least one first fabrication robot could be positioned or positionable within such a first trolley position range. The first trolley position range could then alternatively be time-invariable, although a time-variable range is still preferred. To allow the elongate metal workpiece to be on the first set of trolleys within the workpiece transfer range, the at least one first fabrication robot may then be adjustable to extend only below a level at which the elongate metal workpiece is received on the first set of trolleys.

In embodiments, including in the shown examples, the first set 6 of trolleys 6a-6d is movable along the first track 3 while the elongate metal workpiece 2 is received on the first set 6 of trolleys 6a-6d to thereby move the received elongate metal workpiece 2 along the X-direction.

In this way, a position along the X-direction in which the workpiece 2 is received by the set 5 of rotator assemblies 5a-5d can advantageously be adjusted with respect to a position in which the workpiece 2 is initially received by the first set 6 of trolleys 6a-6d, so that a particularly versatile fabrication assembly 1 can be provided, in particular wherein such positions can be chosen in accordance with handling and/or processing constraints, such as regarding fabrication positions along the main axis W of the workpiece 2.

As an example, in FIG. 5A it can be seen that the first set 6 of trolleys 6a-6d with the workpiece 2 thereon has been moved along the track 3 with respect to FIG. 4A. A similar movement is seen for a subsequent workpiece 14 in FIG. 10A with respect to FIG. 9A.

In embodiments, including in the shown examples, respective rotator positions of the set 5 of rotator assemblies 5a-5d along the X-direction are adjustable, for example along one or more tracks extending in the X-direction.

Thereby, the rotator assemblies 5a-5d can advantageously be positioned to receive a workpiece 2 at positions along the workpiece main axis W where no metal fabrication action needs to be performed.

In embodiments, including in the examples shown in FIGS. 1 to 11B, 13 and 14, the fabrication assembly 1 further comprises a first cross transport assembly 7 arranged at a distance from the set 5 of rotator assemblies 5a-5d and configured to transport an elongate metal workpiece 2 with respect to the first track 3 substantially in the Y-direction with the workpiece main axis W substantially parallel to the X-direction, wherein the first cross transport assembly 7 extends towards the first track 3 for direct transfer of the elongate metal workpiece 2 between the first cross transport assembly 7 and the first set 6 of trolleys 6a-6d substantially in the Y-direction.

In this way, the workpiece 2 can advantageously be transported from an upstream process in a relatively compact and stable way, in particular with little or no movement in the X- and Z-directions (the Z-direction being the vertical direction). Moreover, a buffering of subsequent workpieces can be enabled along the Y-direction.

Alternatively, as shown for example in FIG. 12, the fabrication assembly 1 could be free from such a cross transport assembly, thereby providing a particularly compact fabrication assembly, wherein for example a workpiece may be positioned on the first set 6 of trolleys 6a, 6b using a hoisting assembly.

FIG. 13 shows an example in which the first cross transport assembly 7 extends on a same lateral side of the first track 3 as the set 5 of rotator assemblies 5a-5d, thereby providing a more elongate overall configuration of the fabrication assembly 1 compared to the configuration of FIGS. 1 to 11B, which may be more suitable for some sites depending on local spatial constraints. In the example of FIG. 13, the first set 6 of trolleys 6a-6d can advantageously transport the workpiece along the X-direction between where the first cross transport assembly 7 is arranged and where the set 5 of rotator assemblies 5a-5d is arranged.

To facilitate the direct transfer between the first cross transport assembly 7 and the first set 6 of trolleys 6a-6d, the first cross transport assembly 7 may be provided with a respective set of lifters 15 configured to adjust a vertical level of the elongate metal workpiece 2. In FIGS. 2B, 3B, 4B, 5B, it can be seen how such a set of lifters 15 can operate to facilitate such a transfer. In the example of FIG. 12, similar lifters 17 are provided without such a cross transport assembly, for example for receipt of a workpiece from a hoisting assembly and subsequent transfer to the first set 6 of trolleys 6a-6b.

More generally, in embodiments, including in the shown examples, the fabrication assembly 1 comprises at least one set of lifters 15, 16, 17 configured to adjust a vertical level of the elongate metal workpiece 2 for transfer of the workpiece 2 in the Y-direction between elements of the fabrication assembly 1.

As a further example of such lifters, in embodiments, including in the shown examples, the set 5 of rotator assemblies 5a-5d is provided with a set of lifters 16, in particular each rotator assembly 5a-5d is provided with a respective lifter 16. For example, FIG. 6B shows such a lifter 16 in an upward position compared to FIG. 5B. Similarly, FIG. 9B shows the same lifter 16 in an upward position compared to FIG. 8B, here for transfer from the set 5 of rotator assemblies to a second set 10 of trolleys, as will be explained further elsewhere herein.

It shall be appreciated that where the present disclose refers to lifters, this term does not encompass hoisting assemblies or other suspension means. By contrast, in the present context, a lifter refers to an assembly supported on a floor, optionally via one or more intermediate structures therebetween, and comprising a height-adjustable support structure on which at least a section of the workpiece can be supported.

To effect the various transfers of the workpiece 2 in the Y-direction, elements of the fabrication assembly 1, in particular the cross transport assemblies 7, 11, the trolleys 6a-6d, 11a-11d and the lifters 15, 16, 17, are preferably provided with chain mechanisms comprising drivable chains provided with cams configured to engage the workpiece 2 to move the workpiece along the Y-direction. Such chain mechanisms are known as such for horizontal transport of elongate metal workpieces transverse to their workpiece main axis along a support structure.

In embodiments, including in the shown examples, the fabrication assembly 1 comprises a second track 8 extending substantially parallel to the first track 3 at an opposite side of the set 5 of rotator assemblies 5a-5d from the first track 3, wherein at least one second fabrication robot 9a, 9b is coupled to the second track 8 so as to be movable along the second track 8, wherein a second set 10 of trolleys 10a-10d is movable along the second track 8.

The at least one second fabrication robot 9a, 9b is configured to perform metal fabrication action on the elongate metal workpiece 2 within the fabrication operational range F when the at least one second fabrication robot 9a, 9b is within the fabrication operational range F while the elongate metal workpiece 2 is received by the set 5 of rotator assemblies 5a-5d, for example as shown in FIGS. 7A-B. For clarity of the drawings, the at least one second fabrication robot 9a, 9b is not shown in the side views of FIGS. 2B, 3B, 4B, 5B, 6B, 8B, 9B, 10B, 11B.

The second set 10 of trolleys 10a-10d is configured to receive the elongate metal workpiece 2 thereon with the workpiece main axis W substantially parallel to the X-direction, wherein the fabrication assembly 1 is configured to transfer the elongate metal workpiece 2 between the second set 10 of trolleys 10a-10d and the set 5 of rotator assemblies 5a-5d within the workpiece transfer range T substantially in the Y-direction.

In this way, various advantages as described above can be correspondingly provided at an opposite lateral side of the set 5 of rotator assemblies 5a-5d, wherein fabrication action can be performed simultaneously from two lateral sides of the workpiece, and wherein for example one lateral side of the set 5 of rotator assemblies 5a-5d can serve as an infeed side while another lateral side thereof serves as an outfeed side to enable an efficient flow-like processing of subsequent workpieces. In the shown examples, the lateral side corresponding to the first track 3 and the first cross transport assembly 7 is used as an infeed side while the opposite lateral side corresponding to the second track 8 and the second cross transport assembly 11 is used as an outfeed side. However, it shall be appreciated that an inverse flow direction may well be possible, in particular in view of substantial structural symmetries among both lateral sides.

In embodiments, including in the shown examples, the second set 10 of trolleys 10a-10d defines a time-variable first trolley position range P10 along the X-direction depending on actual positions of the first set 10 of trolleys 10a-10d along the second track 8, wherein the at least one second fabrication robot 9a, 9b defines a time-variable first fabrication robot position range P9 along the X-direction depending on the actual position or positions of the at least one second fabrication robot 9a, 9b along the second track 8, wherein the fabrication assembly 1 is configured to prevent any overlap between the second trolley position range P10 and the second fabrication robot position range P9 at any given time.

Advantages thus provided correspond to those explained above regarding position ranges P4 and P6, with reference to the above explanations regarding utilization of two lateral sides of the set 5 of rotator assemblies 5a-5d.

In embodiments, including in the shown examples, the fabrication assembly 1 further comprises a second cross transport assembly 11 arranged at a distance from the set 5 of rotator assemblies 5a-5d and configured to transport an elongate metal workpiece 2 with respect to the first and second tracks 3, 8 substantially in the Y-direction with the workpiece main axis W substantially parallel to the X-direction.

The second cross transport assembly 11 extends towards the second track 8 for direct transfer of the elongate metal workpiece 2 between the second cross transport assembly 11 and the second set 10 of trolleys 10a-10d substantially in the Y-direction.

Advantages thus provided correspond to those explained above regarding the first cross transport assembly 7, with reference to the above explanations regarding utilization of two lateral sides of the set 5 of rotator assemblies 5a-5d.

In embodiments, the method further comprises: causing the fabrication assembly 1 to transfer the elongate metal workpiece 2 from the set 5 of rotator assemblies 5a-5d to the second set 10 of trolleys 10a-10d within the workpiece transfer range T substantially in the Y-direction, for example as shown in FIGS. 8A-10B.

In embodiments of the method, the at least one second fabrication robot 9a, 9b is positioned outside the workpiece transfer range T while the elongate metal workpiece 2 is on the second set 10 of trolleys 10a-10d.

In embodiments of the method, the second set 10 of trolleys 10a-10d is positioned outside the fabrication operational range F while metal fabrication is performed by the fabrication assembly 1 using the at least one second fabrication robot 9a, 9b.

Advantages thus provided correspond to those explained above, with reference to the above explanations regarding utilization of two lateral sides of the set 5 of rotator assemblies 5a-5d.

In embodiments, including in the shown examples, the set 5 of rotator assemblies 5a-5d is adjustable between a first transfer state and a second transfer state. In the first transfer state, see e.g. FIGS. 5A-6B, 10A-11B, the elongate metal workpiece 2 is transferrable between the set 5 of rotator assemblies 5a-5d and the first set 6 of trolleys 6a-6d on the first track 3 substantially in the Y-direction. In the second transfer state, see e.g. FIGS. 8A-9B, the elongate metal workpiece 2 is transferrable between the set 5 of rotator assemblies 5a-5d and the second set 10 of trolleys 10a-10d on the second track 8 substantially in the Y-direction.

Thereby, the set 5 of rotator assemblies 5a-5d can exchange a workpiece 2 selectively with the first 6 or second 10 set of trolleys. As shown, the first transfer state and the second transfer state may differ by a rotator rotation of about 180 degrees about the rotator rotation axis R (indicated e.g. in FIGS. 1 and 8B) of the set 5 of rotator assemblies 5a-5d.

In embodiments, for example as shown in FIGS. 9A-B, the method further comprises receiving a subsequent elongate metal workpiece 14 on the first set 6 of trolleys 6a-6d while the fabrication assembly 1 transfers the elongate metal workpiece 2 from the set 5 of rotator assemblies 5a-5d to the second set 10 of trolleys 10a-10d.

A relatively dense flow of workpieces can be enabled thereby, promoting efficiency.

In embodiments, with reference to FIGS. 9A-10B, while the set 5 of rotator assemblies 5a-5d is adjusted from the second transfer state to the first transfer state, the first set 6 of trolleys 6a-6d with the second workpiece 14 thereon may be moved along the first track 3 to adjust the position of the second workpiece 14 along the X-direction and/or the second set 10 of trolleys 10a-10d with the first workpiece 2 thereon may be moved along the second track 8 to adjust the position of the first workpiece 2 along the X-direction.

Further efficiency gains can thus be enabled, in particular wherein one or more workpiece positioning actions can be performed at the same time as an adjustment of the set 5 of rotator assemblies 5a-5d for receiving a subsequent workpiece 14.

In embodiments, the method comprises adjusting at least one position of the set 5 of rotator assemblies 5a-5d along the X-direction, after the fabrication assembly 1 transfers the elongate metal workpiece 2 from the set 5 of rotator assemblies 5a-5d to the second set 10 of trolleys 10a-10d, before receipt of the subsequent elongate metal workpiece 14, in particular while the subsequent elongate metal workpiece 14 is on the first set 6 of trolleys 6a-6d.

With reference to the above more general explanation regarding adjustment of the rotator assemblies 5a-5d along the X-direction, such an intermediate adjustment enables the positions of the rotator assemblies 5a-5d to be customized for each individual workpiece 2, 14, in particular in a relatively efficient manner.

In embodiments, including in the shown examples, the at least one first fabrication robot 4a, 4b comprises at least one of a welding robot 4a and a handling robot 4b. Similarly, the at least one second fabrication robot 9a, 9b, if provided, may comprise at least one of a welding robot 9a, 9b and a handling robot. In the shown examples, the second fabrication robots 9a, 9b are both welding robots, while the first fabrication robots 4a include one welding robot 4a and one handling robot 4b.

Possible details and advantages of such fabrication robots are known as such and can advantageously be realized in the context of embodiments of the present invention.

Figure 14:
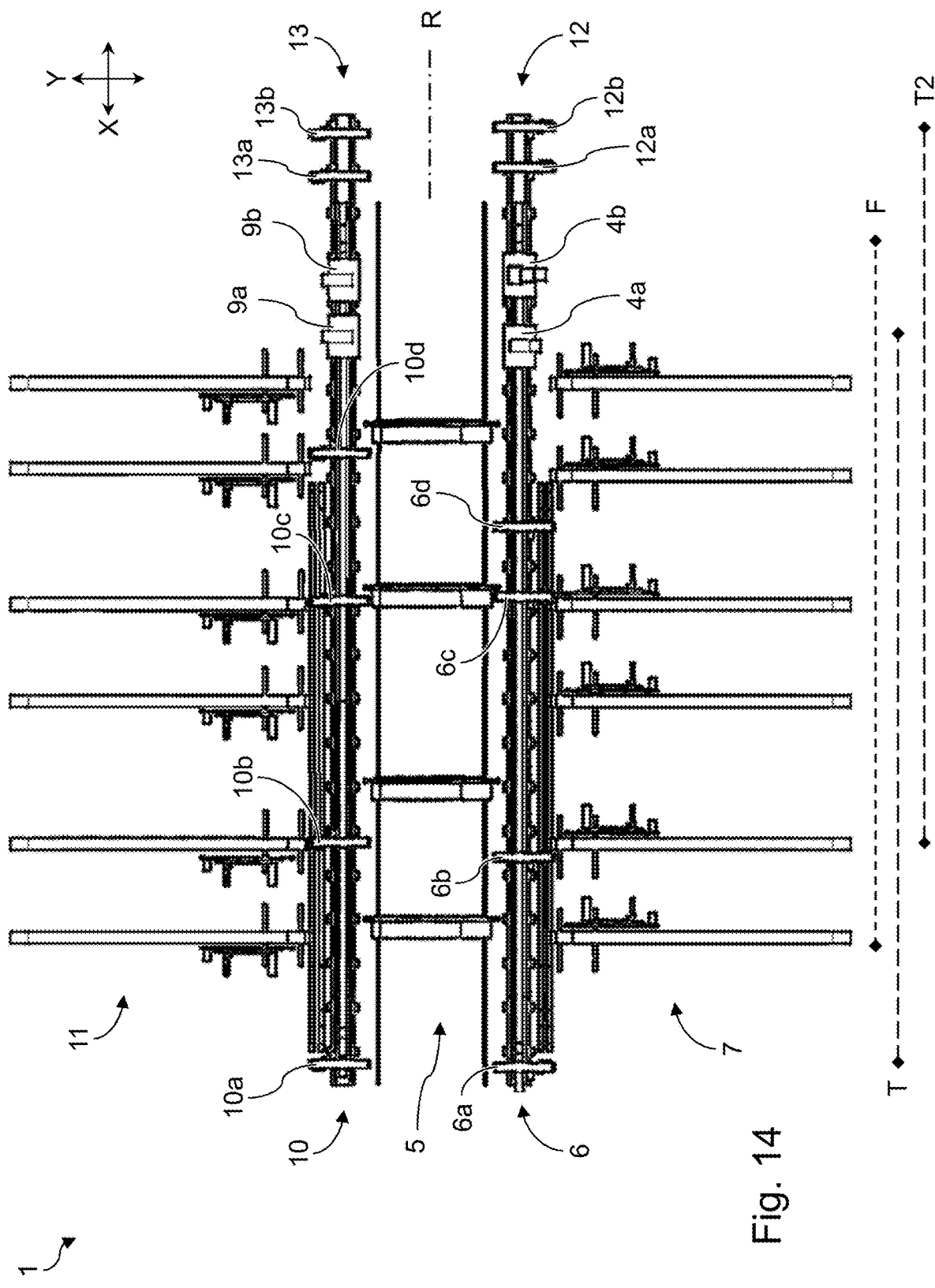
FIG. 14 shows a top view of a still further example of a fabrication assembly according to embodiments.

In embodiments, with reference to FIG. 14 as an example, the at least one first fabrication robot 4a, 4b is arranged along the first track 3 between the first set 6 of trolleys 6a-6d and a further first set 12 of trolleys 12a-12b. Similarly, the at least one second fabrication robot 9a, 9b, if provided, may be arranged along the second track 13 between the second set 10 of trolleys 10a-10d and a further second set 13 of trolleys 13a-13b.

The further sets 12, 13 of trolleys may generally be configured similar to the sets 6, 10, albeit at an opposite side of the fabrication robots 4a, 4b, 9a, 9b. The further sets 12, 13 of trolleys may be configured to transfer a workpiece within a further workpiece transfer range T2 that, similar to the workpiece transfer range T, at least partly overlaps with the fabrication operational range F. In FIG. 14 it can be seen that the further workpiece transfer range T2 may extend outside the fabrication operational range F at a different end compared to the workpiece transfer range T, corresponding to the relative arrangements of the sets and further sets of trolleys with respect to the fabrication robots.

Advantageously, such an arrangement may enable parallel processing of workpieces, in particular relatively short workpieces, wherein the fabrication robots can perform metal fabrication actions on one workpiece, for example on a left side in FIG. 14, while in parallel workpiece transfers are carried out, for example on a right side in FIG. 14, and subsequently vice versa. As can be seen in FIG. 14, the workpiece transfer range T and further workpiece transfer range T2 can mutually overlap, in particular to provide additional versatility in handling workpieces of different lengths.

Although the invention has been explained herein using examples of embodiments and drawings, these do not limit the scope of the invention as defined by the claims. Many variations, combinations and extensions are possible, as shall be appreciated by the skilled person having the benefit of the present disclosure. Examples thereof have been provided throughout the description. All such variants are included within the scope of the invention as defined by the claims.

LIST OF REFERENCE SIGNS

| | |
|---|---|
| 1. | Fabrication assembly |
| 2. | First elongate metal workpiece |
| 3. | First track |
| 4a. | First fabrication robot, welding robot |
| 4b. | First fabrication robot, handling robot |
| 5. | Set of rotator assemblies |
| 5a-5d. | Rotator assembly |
| 6. | First set of trolleys |
| 6a-6d. | Trolley of first set of trolleys |
| 7. | First cross transport assembly |
| 8. | Second track |
| 9a. | Second fabrication robot, welding robot |
| 9b. | Second fabrication robot, welding robot |

-continued

LIST OF REFERENCE SIGNS

| | |
|---|---|
| 10. | Second set of trolleys |
| 10a-10d. | Trolley of second set of trolleys |
| 11. | Second cross transport assembly |
| 12. | Further first set of trolleys |
| 12a-12b. | Trolley of further first set of trolleys |
| 13. | Further second set of trolleys |
| 13a-13b. | Trolley of further second set of trolleys |
| 14. | Second elongate metal workpiece |
| 15. | Lifter of cross transport assembly |
| 16. | Lifter of rotator assembly |
| 17. | Lifter |
| F. | Fabrication operational range |
| P4. | First fabrication robot position range |
| P6. | First trolley position range |
| P9. | Second fabrication robot position range |
| P10. | Second trolley position range |
| R. | Rotator rotation axis |
| T. | Workpiece transfer range |
| W. | Workpiece main axis |
| X. | X-direction of fabrication assembly |
| Y. | Y-direction of fabrication assembly |
| Z. | Z-direction of fabrication assembly |

The invention claimed is:

1. A fabrication assembly for automated metal fabrication on an elongate metal workpiece having a workpiece main axis, comprising:
   a first track extending horizontally and linearly, defining a horizontal X-direction of the fabrication assembly;
   at least one first fabrication robot coupled to the first track so as to be movable along the first track at least within a fabrication operational range along the X-direction; and
   a set of rotator assemblies arranged or arrangeable on one side of the first track within the fabrication operational range and configured to receive the elongate metal workpiece with the workpiece main axis parallel to the X-direction, and to rotate the received elongate metal workpiece about a rotator rotation axis parallel to the X-direction,
   wherein the at least one first fabrication robot is configured to perform a metal fabrication action on the elongate metal workpiece within the fabrication operational range when the at least one first fabrication robot is within the fabrication operational range while the elongate metal workpiece is received by the set of rotator assemblies within the fabrication operational range,
   wherein the fabrication assembly further comprises a first set of trolleys movable along the first track at least within a workpiece transfer range along the X-direction that at least partly overlaps with the fabrication operational range, the first set of trolleys being configured to receive the elongate metal workpiece thereon with the workpiece main axis parallel to the X-direction, and
   wherein the fabrication assembly is configured to transfer the elongate metal workpiece between the first set of trolleys and the set of rotator assemblies within the workpiece transfer range substantially in a Y-direction being a horizontal direction transverse to the X-direction.

2. The fabrication assembly according to claim 1, wherein the at least one first fabrication robot is movable along the first track to outside the workpiece transfer range.

3. The fabrication assembly according to claim 1, wherein the first set of trolleys is movable along the first track to outside the fabrication operational range.

4. The fabrication assembly according to claim 1, wherein the first set of trolleys is coupled to the first track.

5. The fabrication assembly according to claim 1, wherein the first set of trolleys bridges the first track in the Y-direction.

6. The fabrication assembly according to claim 1, wherein the first set of trolleys defines a time-variable first trolley position range along the X-direction depending on actual positions of the first set of trolleys along the first track, wherein the at least one first fabrication robot defines a time-variable first fabrication robot position range along the X-direction depending on the actual position or positions of the at least one first fabrication robot along the first track, and wherein the fabrication assembly is configured to prevent any overlap between the first trolley position range and the first fabrication robot position range at any given time.

7. The fabrication assembly according to claim 1, wherein the first set of trolleys is movable along the first track while the elongate metal workpiece is received on the first set of trolleys to thereby move the received elongate metal workpiece along the X-direction.

8. The fabrication assembly according to claim 1, further comprising a first cross transport assembly arranged at a distance from the set of rotator assemblies and configured to transport an elongate metal workpiece with respect to the first track substantially in the Y-direction with the workpiece main axis parallel to the X-direction, and
wherein the first cross transport assembly extends towards the first track for direct transfer of the elongate metal workpiece between the first cross transport assembly and the first set of trolleys substantially in the Y-direction.

9. The fabrication assembly according to claim 1, further comprising a second track extending parallel to the first track at an opposite side of the set of rotator assemblies from the first track, wherein at least one second fabrication robot is coupled to the second track so as to be movable along the second track, and wherein a second set of trolleys is movable along the second track,
wherein the at least one second fabrication robot is configured to perform a metal fabrication action on the elongate metal workpiece within the fabrication operational range when the at least one second fabrication robot is within the fabrication operational range while the elongate metal workpiece is received by the set of rotator assemblies,
wherein the second set of trolleys is configured to receive the elongate metal workpiece thereon with the workpiece main axis parallel to the X-direction, and
wherein the fabrication assembly is configured to transfer the elongate metal workpiece between the second set of trolleys and the set of rotator assemblies within the workpiece transfer range substantially in the Y-direction.

10. The fabrication assembly according to claim 9, wherein the set of rotator assemblies is adjustable between a first transfer state and a second transfer state,
wherein in the first transfer state the elongate metal workpiece is transferrable between the set of rotator assemblies and the first set of trolleys on the first track substantially in the Y-direction, and
wherein in the second transfer state the elongate metal workpiece is transferrable between the set of rotator assemblies and the second set of trolleys on the second track substantially in the Y-direction.

11. The fabrication assembly according to claim 9, further comprising a first cross transport assembly arranged at a distance from the set of rotator assemblies and configured to transport an elongate metal workpiece with respect to the first track substantially in the Y-direction with the workpiece main axis parallel to the X-direction,
wherein the first cross transport assembly extends towards the first track for direct transfer of the elongate metal workpiece between the first cross transport assembly and the first set of trolleys substantially in the Y-direction,
wherein the fabrication assembly further comprises a second cross transport assembly arranged at a distance from the set of rotator assemblies and configured to transport an elongate metal workpiece with respect to the first and second tracks substantially in the Y-direction with the workpiece main axis parallel to the X-direction, and
wherein the second cross transport assembly extends towards the second track for direct transfer of the elongate metal workpiece between the second cross transport assembly and the second set of trolleys (10a-10d) substantially in the Y-direction.

12. The fabrication assembly according to claim 1, wherein the at least one first fabrication robot is arranged along the first track between the first set of trolleys and a further first set of trolleys.

13. The fabrication assembly according to claim 1, wherein the at least one first fabrication robot comprises at least one of a welding robot and a handling robot.

14. The fabrication assembly according to claim 1, wherein the workpiece transfer range overlaps with at least 50% of the fabrication operational range.

15. The fabrication assembly according to claim 1, further comprising at least one set of lifters configured to adjust a vertical level of the elongate metal workpiece for transfer of the workpiece in the Y-direction between elements of the fabrication assembly.

16. A method of automated metal fabrication on an elongate metal workpiece having a workpiece main axis, comprising:
providing the fabrication assembly according to claim 1;
receiving the elongate metal workpiece on the first set of trolleys with the workpiece main axis parallel to the X-direction;
causing the fabrication assembly to transfer the elongate metal workpiece from the first set of trolleys to the set of rotator assemblies within the workpiece transfer range substantially in the Y-direction, thereby causing the elongate metal workpiece to be received by the set of rotator assemblies; and
causing the fabrication assembly to perform metal fabrication on the elongate metal workpiece within the fabrication operational range while the elongate metal workpiece is received by the set of rotator assemblies.

17. The method according to claim 16, wherein the at least one first fabrication robot is positioned outside the workpiece transfer range while the elongate metal workpiece is on the first set of trolleys.

18. The method according to claim 16, wherein the first set of trolleys is positioned outside the fabrication operational range while metal fabrication is performed by the fabrication assembly using the at least one first fabrication robot.

19. The method according to claim 16, further comprising a second track extending parallel to the first track at an opposite side of the set of rotator assemblies from the first track, wherein at least one second fabrication robot is coupled to the second track so as to be movable along the second track, and wherein a second set of trolleys is movable along the second track,
- wherein the at least one second fabrication robot is configured to perform a metal fabrication action on the elongate metal workpiece within the fabrication operational range when the at least one second fabrication robot is within the fabrication operational range while the elongate metal workpiece is received by the set of rotator assemblies,
- wherein the second set of trolleys is configured to receive the elongate metal workpiece thereon with the workpiece main axis parallel to the X-direction,
- wherein the fabrication assembly is configured to transfer the elongate metal workpiece between the second set of trolleys and the set of rotator assemblies within the workpiece transfer range substantially in the Y-direction, and
- wherein the method further comprises:
- causing the fabrication assembly to transfer the elongate metal workpiece from the set of rotator assemblies to the second set of trolleys within the workpiece transfer range substantially in the Y-direction.

20. The method according to claim 19, wherein the at least one second fabrication robot is positioned outside the workpiece transfer range while the elongate metal workpiece is on the second set of trolleys.

21. The method according to claim 19, wherein the second set of trolleys is positioned outside the fabrication operational range while metal fabrication is performed by the fabrication assembly using the at least one second fabrication robot.

22. The method according to claim 19, further comprising receiving a subsequent elongate metal workpiece on the first set of trolleys while the fabrication assembly transfers the elongate metal workpiece from the set of rotator assemblies to the second set of trolleys.

23. The method according to claim 22, further comprising adjusting at least one position of the set of rotator assemblies along the X-direction, after the fabrication assembly transfers the elongate metal workpiece from the set of rotator assemblies to the second set of trolleys, while the subsequent elongate metal workpiece is on the first set of trolleys.

\* \* \* \* \*